(12) United States Patent
Cowie et al.

(10) Patent No.: US 6,717,992 B2
(45) Date of Patent: Apr. 6, 2004

(54) METHOD AND APPARATUS FOR RECEIVING A PLURALITY OF TIME SPACED SIGNALS

(75) Inventors: Ivan A. Cowie, Madison, AL (US); Mark D. Roberts, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 239 days.

(21) Appl. No.: 09/879,198

(22) Filed: Jun. 13, 2001

(65) Prior Publication Data

US 2003/0095609 A1 May 22, 2003

(51) Int. Cl.[7] .................................................. H03K 9/00
(52) U.S. Cl. ........................ 375/316; 375/136; 375/325; 375/340
(58) Field of Search ................................. 375/130, 136, 375/137, 138, 256, 260, 285, 316, 325, 340, 343; 370/280, 294, 321, 324, 442, 498, 503; 342/21

(56) References Cited

U.S. PATENT DOCUMENTS

| | | | |
|---|---|---|---|
| 4,621,365 A | 11/1986 | Chiu | |
| 4,641,317 A | 2/1987 | Fullerton | |
| 4,675,880 A | 6/1987 | Davarian | |
| 4,813,057 A | 3/1989 | Fullerton | |
| 4,901,307 A | 2/1990 | Gilhousen et al. | |
| 4,979,186 A | 12/1990 | Fullerton | |
| 5,363,057 A | 11/1994 | Fullerton | |
| 5,363,108 A | 11/1994 | Fullerton | |
| 5,523,760 A | 6/1996 | McEwan | |
| 5,559,519 A | 9/1996 | Fenner | |
| 5,610,907 A | 3/1997 | Barrett | |
| 5,677,927 A | 10/1997 | Fullerton | |
| 5,687,169 A | 11/1997 | Fullerton | |
| 5,764,696 A | 6/1998 | Barnes et al. | |
| 5,809,063 A | 9/1998 | Ashe et al. | |
| 5,812,081 A | * 9/1998 | Fullerton | ...................... 342/21 |
| 5,832,035 A | 11/1998 | Fullerton | |
| 5,847,677 A | 12/1998 | McCorkle | |
| 5,963,581 A | 10/1999 | Fullerton et al. | |
| 6,111,536 A | 8/2000 | Richards et al. | |
| 6,133,876 A | 10/2000 | Fullerton et al. | |
| 6,304,623 B1 | * 10/2001 | Richards et al. | ............. 375/355 |

OTHER PUBLICATIONS

Win et al., "Ultra–Wide Bandwidth Time–Hopping Spread–Spectrum Impulse Radio for Wireless Multiple–Access Communications," IEEE Transactions on Communications, vol. 48, pp. 679–689, Apr. 2000.*

* cited by examiner

Primary Examiner—Chieh M. Fan
(74) Attorney, Agent, or Firm—Venable LLP; Robert Babayi, Esq.

(57) ABSTRACT

A method and system for receiving time spaced signals transmitted in accordance with a time layout is provided. The time spaced signals may be pulses or bursts. The time spaced signals convey at least one intelligence signal. The time spaced signals are received at an antenna. Once received, the time spaced signals may be coherently detected. Coherent detection may be accomplished by correlating the received signals with a template signal. The detection process can also include integration of the received signals. The coherently detected signals are then contributed to a plurality of intermediate signals based on an interleaving order, which may be predetermined or specified by an interleaving code. Each of the plurality of intermediate signals can then be separately integrated, for example, to produce bits of data. The bits of data are ordered to produce the at least one intelligence signal based on a bit order, which may be predetermined or specified by a bit ordering code.

36 Claims, 18 Drawing Sheets

Pulse Train Spectrum (Single Pulse = 10K System)

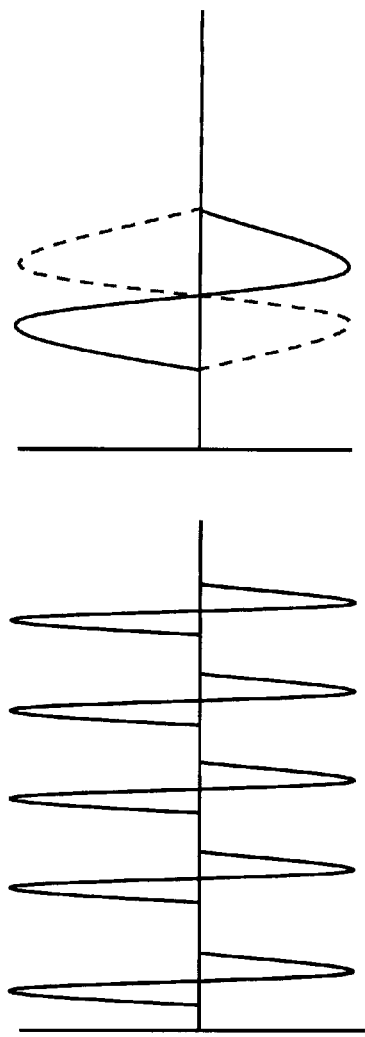
FIG. 4A Early – Late Modulation
FIG. 4B One of Many Modulation
FIG. 4C Flip Modulation
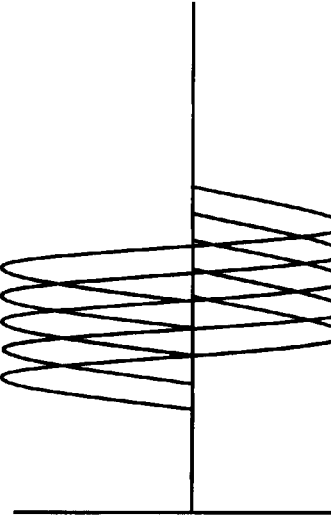
FIG. 4E Vector Modulation
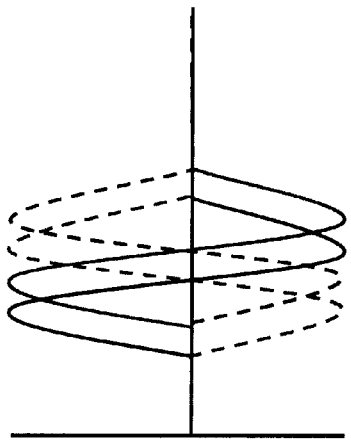
FIG. 4D Quad Flip Modulation

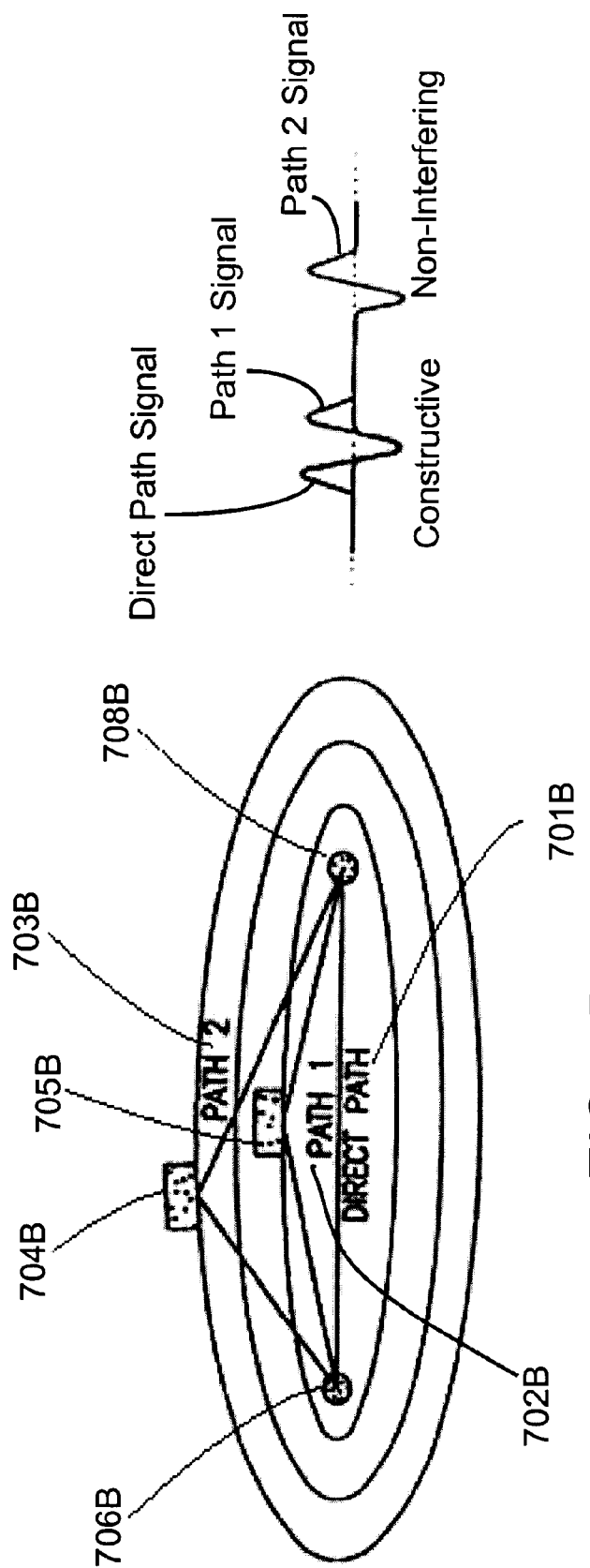

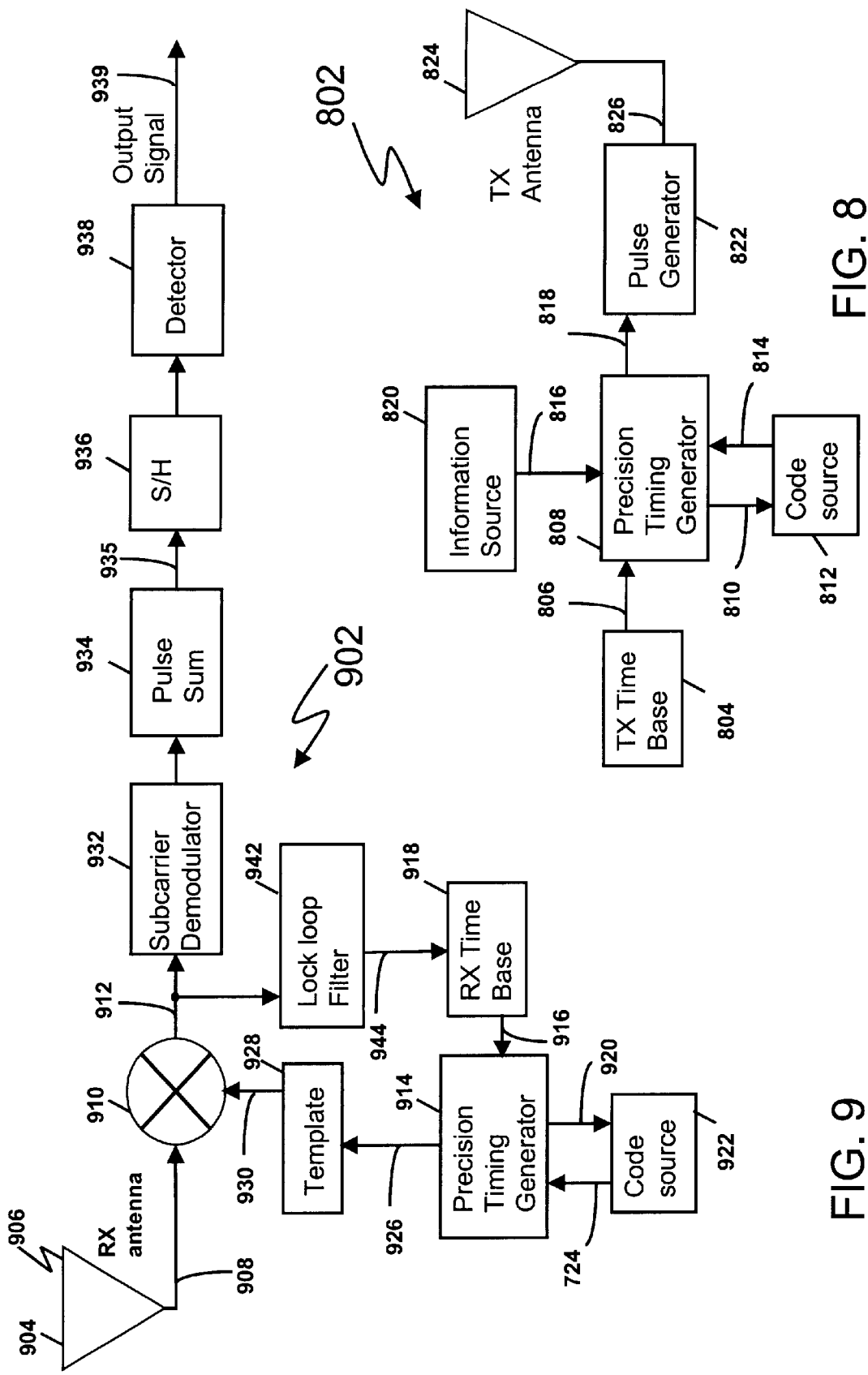

METHOD AND APPARATUS FOR RECEIVING A PLURALITY OF TIME SPACED SIGNALS

CROSS-REFERENCE TO OTHER APPLICATIONS

The following applications of common assignee may contain common disclosure with the present application:

U.S. patent application Ser. No. 09/638,192 entitled "A METHOD FOR SPECIFYING NON-TEMPORAL PULSE CHARACTERISTICS", filed on Aug. 15, 2000.

U.S. patent application Ser. No. 09/638,046 entitled "A METHOD AND APPARATUS FOR APPLYING CODES HAVE PREDEFINED PROPERTIES", filed on Aug. 15, 2000.

U.S. patent application Ser. No. 09/637,878 entitled "A METHOD AND APPARATUS FOR POSITIONING PULSES USING A LA YOUT HAVING NON-ALLOWABLE REGIONS", filed on Aug. 15, 2000.

U.S. patent application Ser. No. 09/638,150 entitled "A METHOD AND APPARATUS FOR POSITIONING PULSES IN TIME", filed on Aug. 15, 2000.

U.S. patent application Ser. No. 09/638,151 entitled "A METHOD AND APPARATUS FOR MAPPING PULSES TO A NON-FIXED LAYOUT", filed on Aug. 15, 2000.

U.S. patent application Ser. No. 09/638,152 entitled "A METHOD AND APPARATUS FOR SPECIFYING PULSE CHARACTERISTICS USING CODE THAT SATISFIES PREDEFINED CRITERIA", filed on Aug. 15, 2000.

U.S. patent application Ser. No. 09/638,153 entitled "A METHOD FOR SPECIFYING PULSE CHARACTERISTICS USING CODES", filed on Aug. 15, 2000.

U.S. patent application Ser. No. 09/638,154 entitled "A METHOD FOR SPECIFYING NON-ALLOWABLE PULSE CHARACTERISTICS", filed on Aug. 15, 2000.

U.S. patent application Ser. No. 09/708,025 entitled "A METHOD AND APPARATUS FOR GENERATING A PULSE TRAIN WITH SPECIFIABLE SPECTRAL RESPONSE CHARACTERISTICS", filed on Nov. 8, 2000.

The above-listed applications are incorporated herein by reference in their entireties.

TECHNICAL FIELD

The present invention relates to impulse radio systems and, more particularly, to a method and apparatus for receiving time spaced signals.

BACKGROUND OF THE INVENTION

As the availability of communication bandwidth in the increasingly crowded frequency spectrum is becoming a scarce and valuable commodity, Ultra Wideband (IWB) technology provides an excellent alternative for offering significant communication bandwidth, particularly, for various wireless communications applications. Because UWB communication systems are based on communicating extremely short-duration pulses (e.g., pico-seconds in duration), such systems are also known as impulse radio systems. Impulse radio systems are described in a series of patents, including U.S. Pat. Nos. 4,641,317 (issued Feb. 3, 1987), 4,813,057 (issued Mar. 14, 1989), 4,979,186 (issued Dec. 18, 1990), and 5,363,057 (issued Nov. 8, 1994) to Larry W. Fullerton, and U.S. Pat. Nos. 5,677,927 (issued Oct. 14, 1997), 5,687,169 (issued Nov. 11, 1997), and 5,832,035 (issued Nov. 3, 1998) to Larry W. Fullerton, et al. These patents are incorporated herein by reference.

Multiple access impulse radio systems are radically different from conventional Code Division Multiple Access (CDMA), Time Division Multiple Access (TDMA) and Frequency Division Multiple Access (FDMA) systems. Unlike such systems, which use continuous sinusoidal waveforms for transmitting information, a conventional impulse radio transmitter emits a low power electromagnetic train of short pulses, which are shaped to approach a Gaussian monocycle. As a result, the impulse radio transmitter uses very little power to generate noise-like communication signals for use in multiple-access communications, radar and positioning applications, among other things. In the multi-access communication applications, the impulse radio systems depend, in part, on processing gain to achieve rejection of unwanted signals. Because of the extremely high achievable processing gains, the impulse radio systems are relatively immune to unwanted signals and interference, which limit the performance of systems that use continuous sinusoidal waveforms. The high processing gains of the impulse radio systems also provide much higher dynamic ranges than those commonly achieved by the processing gains of other known spread-spectrum systems.

Impulse radio communication systems transmit and receive the pulses at precisely controlled time intervals, in accordance with a time-hopping code. As such, the time-hopping code defines a communication channel that can be considered as a unidirectional data path for communicating information at high speed. In order to communicate the information over such channels, impulse radio transmitters may use position modulation, which is a form of time modulation, to position the pulses in time, based on instantaneous samples of a modulating information signal. The modulating information signal may for example be a multi-state information signal, such as a binary signal. Under this arrangement, a modulator varies relative positions of a plurality of pulses on a pulse-by-pulse basis, in accordance with the modulating information signal and a specific time-hopping code that defines the communication channel.

In applications where the modulating information signal is a binary information signal, each binary state may modulate the time position of more than one pulse to generate a modulated, coded timing signal that comprises a train of identically shaped pulses that represent a single data bit. The impulse transmitter applies the generated pulses to a specified transmission medium, via a coupler, such as an antenna, which electromagnetically radiates the pulses for reception by an impulse radio receiver. The impulse radio receiver typically includes a single direct conversion stage. Using a correlator, the conversion stage coherently converts the received pulses to a baseband signal, based on a priori knowledge of the time-hopping code. Because of the correlation properties of the selected time-hopping codes, the correlator integrates the desired received pulses coherently, while the undesired noise signals are integrated non-coherently such that by comparing the coherent and non-coherent integration results, the impulse receiver can recover the communicated information.

Conventional spread-spectrum code division multiple access (SS-CDMA) techniques accommodate multiple users by permitting them to use the same frequency bandwidth at the same time. Direct sequence CDMA systems employ pseudo-noise (PN) codewords generated at a transmitter to "spread" the bandwidth occupied by transmitted data beyond the minimum required by the data. The conventional SS-CDMA systems employ a family of orthogonal or quasi-orthogonal spreading codes, with a pilot spreading code sequence synchronized to the family of codes. Each user is assigned one of the spreading codes as a spreading function. One such spread-spectrum system is described in U.S. Pat. No. 4,901,307 entitled "SPREAD-SPECTRUM MULTIPLE ACCESS COMMUNICATION SYSTEM USING SATELLITE OR TERRESTRIAL REPEATERS" by Gilhousen et al.

Unlike direct sequence spread-spectrum systems, impulse radio communications systems have not employed time-hopping codes for energy spreading, because the monocycle pulses themselves have an inherently wide bandwidth. Instead, the impulse radio systems use the time-hoping codes for channelization, energy smoothing in the frequency domain, and interference suppression. The time-hoping code defines a relative position of each pulse within a group of pulses, or pulse train, such that the combination of pulse positions defines the communications channel. In order to convey information on such communication channel, each state of a multi-state information signal may vary a relative pulse position by a predefined time shift such that a modulated, coded timing signal is generated comprising a train of pulses, each with timing corresponding to the combination of the time position coding and the multi-state modulation. Alternative modulation schemes may also be used instead of time modulation or in combination with it.

In one conventional binary approach, pulses are time-modulated forward or backward about a nominal position. More specifically, each pulse is time modulated by adjusting its position within a time frame to one of two or more possible times. For example, in order to send a "0" binary bit during the time frame, the pulse may be offset from a nominal position of the time frame by about −50 picoseconds. For a "1" binary state, the pulse may be offset from the nominal position by about +50 picoseconds. Conventional coders that generate the time-hoping code do so in response to a periodic timing signal that corresponds to the data-rate of the multi-state information signal. The data rate of the impulse radio transmission may for example be a fraction of a periodic timing signal that is used as a time base or time reference.

Generally speaking, an impulse radio receiver is a direct conversion receiver with a cross correlator front end. The front end coherently converts an electromagnetic pulse train of monocycle pulses to a baseband signal in a single stage. Because each data bit modulates the time position of many pulses of the periodic timing signal, a modulated, coded timing signal is produced comprising a train of identically shaped pulses for each single data bit. The impulse radio receiver integrates multiple pulses to recover the transmitted information.

In practice, decoding errors are minimized using distinctive time-hopping codes with suitable autocorrelation and cross-correlation properties. The cross-correlation between any two time-hopping codes should be low for minimal interference between multiple users in a communications system or between multiple target reflections in radar and positioning applications. At the same time, the autocorrelation property of a time-hoping code should be steeply peaked, with small side-lobes. Maximally peaked time-hopping code autocorrelation yields optimal acquisition and synchronization properties for communications, radar and positioning applications.

Various coding schemes with known correlation characteristics are available. For example, algebraic codes, Quadratic Congruential (QC) codes, Hyperbolic Congruential (HC) codes and optical codes have been suggested in the past for coding in impulse radio systems. Generally, based on known assumptions, the coding schemes guarantee a maximum number of pulse coincidences, i.e., hits, for any defined time frame or time frame shift during which the codes are repeated. For example, HC codes are guaranteed a maximum of two hits for any subframe or frame shift.

McCorkle in U.S. Pat. No. 5,847,677 discloses a random number generator for generating a pseudorandom code for use with jittered pulse repetition interval radar systems. The code is generated by a random number generator that possesses certain attributes desirable for jittered radar. As disclosed, the attributes related to a flat frequency spectrum, a nearly perfect spike for an autocorrelation function, a controllable absolute minimum and maximum interval, long sequences that do not repeat, and a reasonable average pulse rate.

One known coding technique for an impulse radio is disclosed by Barrett in U.S. Pat. No. 5,610,907, entitled "Ultrafast Time Hopping CDMA-RF Communications: Code-As-Carrier, Multichannel Operation, High data Rate Operation and Data Rate on Demand." According to the disclosed techniques, two levels of coding are used: major orthogonal codes are applied to provide multiple channels, and forward error correction (FEC) codes are applied to information data before transmission. The disclosed system relies on dividing time into repetitive super-frames, frames and subframes. As disclosed, a super-frame corresponds to a time interval of about 1 millisecond, representing one repetition of a code pattern, where as a frame is defined as a time interval of about 1 microsecond divided according to a code length. A subframe corresponds to a short time interval of about 1 nanosecond during which a pulse is time positioned.

It is well known that communicated signals over a wireless transmission medium can be subject to various types of interference. In communicating voice messages, data messages, control messages, or other types of messages, interference causes problems by corrupting information intended to be conveyed by the transmission message. As a result, noise, or electromagnetic interference can interfere with efficient communication using impulse radio technology.

In a multi-user environment, impulse radio depends, in part, on processing gain to achieve rejection of unwanted signals. Because of the extremely high processing gain achievable with impulse radio, much higher dynamic ranges are possible than are commonly achieved with other spread spectrum methods. In some multi-user environments where there is a high density of users in a coverage area or where data rates are so high that processing gain is marginal, power control may be used to reduce the multi-user background noise to improve the number of channels available and the aggregate traffic density of the area. Briefly stated, power control generally refers to adjusting the transmitter output power to the minimum necessary power to achieve acceptable signal reception at an impulse radio receiver.

Another known method for mitigating adverse effects of interference in impulse radio communication varies transmission rates (bit rates), signal strength, packet sizes and frequency of packet repetition, and other parameters associated with conveying a transmission message, whatever the source of the interference may be. Some noise, or interference, may be periodic in nature, with a constant period or with a period that varies over time (i.e., quasi-periodic). Such periodic or quasi-periodic noise may be substantially predicted, at least within a limited time period. Other electromagnetic interference may be intermittent and less predictable. Usually no one type of interference occurs alone; most likely an impulse radio communication system will encounter a variety of interference, having varying periodicity or unpredictability, varying strengths, and other varying parameters.

Because UWB technology is applicable to a wide variety of applications including communications, radar, and positioning, transmitted pulse trains may be subject to interfering signals, for example, periodic interference that degrades received signal quality periodically. For example, significant portions of impulse radio system pulse trains may be adversely affected due to exposure to periodic interference resulting in data errors. Therefore, there exists a need for improving received signal quality of impulse radio systems in the presence of periodic interference.

SUMMARY OF THE INVENTION

The present invention provides a method of receiving a signal comprising a plurality of time spaced signals that convey an intelligence signal comprising a series of data bits. The intelligence signal may have been produced by multiplexing a plurality of input signals. The time spaced signals, which may be pulses or bursts, can be positioned uniformly in time or positioned according to a time hopping code over a time layout. Additionally, the time spaced signals can be modulated in accordance with a modulation technique to represent various types of information, e.g., voice or data, as a part of the intelligence signal. Time shift modulation, amplitude modulation, frequency modulation and phase modulation are some of the modulation techniques that may be used to convey the information, for example, as binary data bits.

Reception of time-spaced signals may be a coherent detection process. Coherent detection may be accomplished by mixing the received signals with template signals spaced in time such that they coincide or correlate with the received signals. Generally, the correlation process can include performing short-term integration of the time spaced signals. In accordance with the present invention, the coherently detected signals are contributed to a plurality of intermediate signals in accordance with a defined order, for example a predefined pulse interleaving order. In one embodiment the predefined pulse interleaving order is a sequential order. In another embodiment the predefined pulse interleaving order is a pseudorandom order. Each of the plurality of intermediate signals can then be separately integrated, for example, relative to or independent from the pulse train sequence, to produce the intelligence signal. More specifically, the intermediate signals can be subject to a long-term integration that produces a series of data bits in parallel.

Once derived from the intermediate signals, the series of data bits can be further ordered in accordance with a predefined bit order to convey the intelligence signal. In one embodiment the predefined bit order is a sequential order. In another embodiment the predefined bit order is a pseudo-random order. When multiple input signals are multiplexed in the transmitter to produce the intelligence signal, in one embodiment, the predefined bit order also specifies the demultiplexing of the data bits to multiple output signals that correspond to the input signals.

In a further embodiment, the coherently detected signals can be contributed to the plurality of intermediate signals in accordance with code elements of a pulse interleaving code. In one exemplary embodiment, the pulse interleaving code may be a pseudorandom code having code elements that specify the order in which coherently detected signals are contributed to the intermediate signals. Thus, each coherently detected signal may be contributed to a different one of the plurality of intermediate signals based on a selected pulse interleaving code.

Similarly, in another embodiment, the order in which data bits derived from intermediate signals are applied to the at least one intelligence signal can be specified in accordance with code elements of a bit ordering code, for example, a pseudorandom code.

In accordance with one of the more detailed features of the present invention, various parameters for transmission and reception of the time spaced signals can be modified or delayed based on a quality measure to satisfy a received signal quality criterion. For example, based on the quality measure, the pulse interleaving code may be dynamically modified, thereby changing the contribution of the coherently detected signals to the intermediate signals in a dynamic manner. Under this arrangement, a quality measure for the intermediate signals or the recovered intelligence signals can be determined. Then, the contribution of the coherently detected signals to the intermediate signals may be modified based on the quality measure. The contribution can be varied based on at least one of a statistical redistribution, a random redistribution, and an optimal order search algorithm. Furthermore, a time hopping code can be modified or the time spaced signals can be delayed to satisfy the received signal quality criterion. The time hopping code may be modified or the time spaced signals may be delayed based on a relationship between a plurality of codes in a code family, to satisfy the received signal quality criterion. Of course, any change to the pulse interleaving code, change to the time hopping code, or delay of the time spaced signals is coordinated between a transmitter and a receiver.

Furthermore, according to yet another embodiment, one intermediate signal can be compared to another intermediate signal, for example, as an amplitude reference and/or a time reference to support amplitude modulation or signal acquisition. Also, an order of the plurality of intermediate signals may be varied according to at least one of a pulse interleaving code and a bit ordering code.

BRIEF DESCRIPTION OF THE DRAWINGS

FIGS. 4A–4E illustrate different modulation techniques applied to a pulse;

FIG. 7B illustrates a typical multipath situation;

FIG. 7C illustrates the received composite pulse waveform resulting from the three propagation paths shown in FIG. 7B;

FIG. 8 illustrates an exemplary embodiment of an impulse radio transmitter of an impulse radio communication system;

FIG. 9 illustrates an exemplary embodiment of an impulse radio receiver for the impulse radio communication system;

DETAILED DESCRIPTION OF THE INVENTION

Overview of the Invention

Figure 1A:
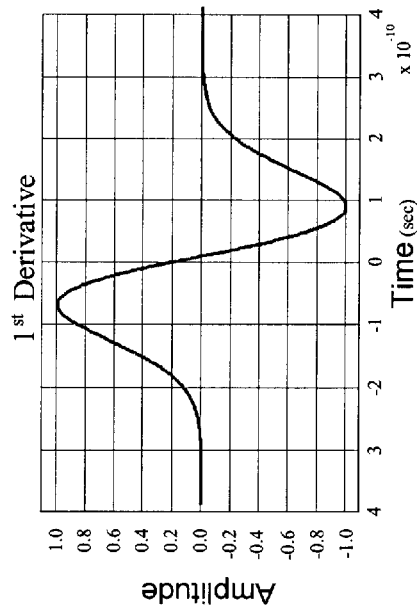
FIG. 1A illustrates a representative Gaussian pulse in the time domain.
Figure 1B:
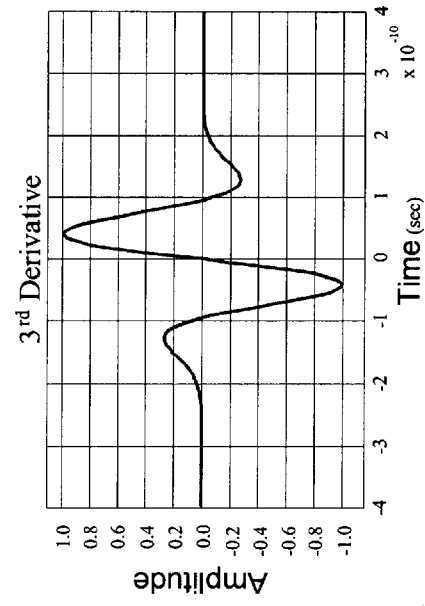
FIG. 1B illustrates a representative Gaussian pulse doublet in the time domain.
Figure 1C:
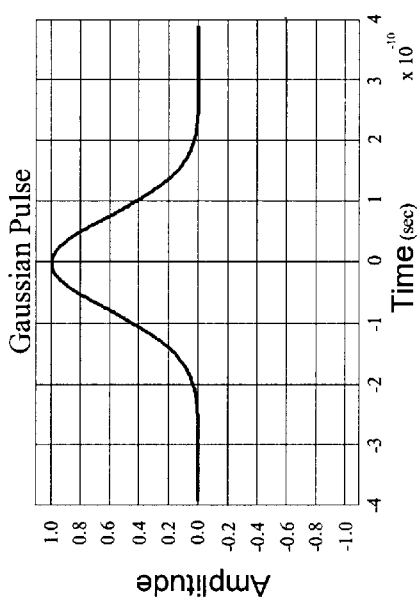
FIG. 1C illustrates a representative Gaussian pulse triplet in the time domain.
Figure 1D:
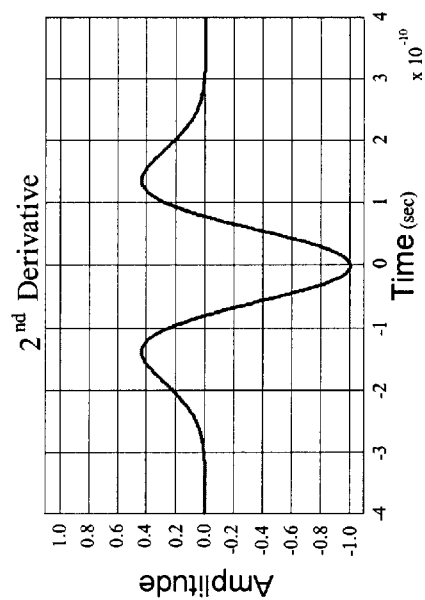
FIG. 1D illustrates a representative Gaussian pulse quadlet in the time domain.

Generally, in an impulse radio system, a pulse train comprising a sequence of pulses is transmitted and received in accordance with a time layout. The pulses are positioned in time in accordance with a time hopping code that defines a channel used by the system to transmit information. The time hopping code includes code elements that specify the position of each pulse in time.

Conventionally, pulses within repeating pulse trains are integrated sequentially to produce an intelligence signal. For example, all pulses in one pulse train are received and integrated to produce a data bit. This process then repeats for the next pulse train in sequence. According to the present invention, however, coherently detected received signals are contributed to a plurality of intermediate signals in accordance with a defined pattern that may include, for example, a sequential, pseudorandom, or other interleaving pattern. An interleaving pattern may be predetermined or be specified by a pulse interleaving code. Sequential contribution can for example involve contributing the first pulse of each repeating pulse train to a first intermediate signal, the second pulse of each repeating pulse train to a second intermediate signal, the third pulse of each repeating pulse train to a third intermediate signal, and so on. Alternatively, a pseudorandom interleaving pattern could, for example, involve contributing the first pulse of each repeating pulse train to a third intermediate signal, the second pulse of each repeating pulse train to a fourth intermediate signal, the third pulse of each repeating pulse train to a first intermediate signal, and so on. In this way, the integration of the pulses representing a number of different data bits can be performed in parallel. That is, the integration to produce different data bits of a bit stream comprising the intelligence signal can be done at the same time such that data bits are generated in parallel. Thus, pulses within a pulse train may be attributed to different data bits. Then, a long-term integration process performed on each intermediate signal produces data bits that are applied to at least one intelligence signal based on a defined bit order that may include, for example, a sequential, pseudorandom, or other bit order. A bit order may be predetermined or be specified by a bit ordering code.

Impulse Radio Technology Overview

Recent advances in communications technology have enabled ultra wideband technology (UWB) or impulse radio communications systems "impulse radio". To better understand the benefits of impulse radio to the present invention, the following review of impulse radio follows.

Impulse radio has been described in a series of patents, including U.S. Pat. Nos. 4,641,317 (issued Feb. 3, 1987), 4,813,057 (issued Mar. 14, 1989), 4,979,186 (issued Dec. 18, 1990) and 5,363,108 (issued Nov. 8, 1994) to Larry W. Fullerton. A second generation of impulse radio patents includes U.S. Pat. Nos. 5,677,927 (issued Oct. 14, 1997), 5,687,169 (issued Nov. 11, 1997), 5,764,696 (issued Jun. 9, 1998), and 5,832,035 (issued Nov. 3, 1998) to Fullerton et al.

Uses of impulse radio systems are described in U.S. patent application Ser. No. 09/332,502, titled, "System and Method for Intrusion Detection using a Time Domain Radar Array" and U.S. patent application Ser. No. 09/332,503, titled, "Wide Area Time Domain Radar Array" both filed on Jun. 14, 1999 both of which are assigned to the assignee of the present invention. The above patent documents are incorporated herein by reference.

This section provides an overview of impulse radio technology and relevant aspects of communications theory. It is provided to assist the reader with understanding the present invention and should not be used to limit the scope of the present invention. The terminology 'impulse radio' is used primarily for historical convenience and can be generally interchanged with the terminology 'impulse communications system, ultra-wideband system, or ultra-wideband communication system'. Furthermore, the described impulse radio technology is generally applicable to various other impulse system applications including but not limited to impulse radar systems and impulse positioning systems. Accordingly, the terminology 'impulse radio' can be generally interchanged with the terminology 'impulse transmission system and impulse reception system.'

Impulse radio refers to a radio system based on short, low duty-cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very broad, or wide, spectral bandwidths approximate a Gaussian shape to a useful degree.

Impulse radio can use many types of modulation, including amplitude modulation, phase modulation, frequency modulation, time-shift modulation (also referred to as pulse-position modulation or pulse-interval modulation) and M-ary versions of these. In this document, the time-shift modulation method is often used as an illustrative example. However, someone skilled in the art will recognize that alternative modulation approaches may, in some instances, be used instead of or in combination with the time-shift modulation approach.

In impulse radio communications, inter-pulse spacing may be held constant or may be varied on a pulse-by-pulse basis by information, a code, or both. Generally, conventional spread spectrum systems employ codes to spread the normally narrow band information signal over a relatively wide band of frequencies. A conventional spread spectrum receiver correlates these signals to retrieve the original information signal. In impulse radio communications, codes are not typically used for energy spreading because the monocycle pulses themselves have an inherently wide bandwidth. Codes are more commonly used for channelization, energy smoothing in the frequency domain, resistance to interference, and reducing the interference potential to nearby receivers. Such codes are commonly referred to as time-hopping codes or pseudo-noise (PN) codes since their use typically causes inter-pulse spacing to have a seemingly random nature. PN codes may be generated by techniques other than pseudorandom code generation. Additionally, pulse trains having constant, or uniform, pulse spacing are commonly referred to as uncoded pulse trains. A pulse train with uniform pulse spacing, however, may be described by a code that specifies non-temporal, i.e., non-time related, pulse characteristics.

In impulse radio communications utilizing time-shift modulation, information comprising one or more bits of data typically time-position modulates a sequence of pulses. This yields a modulated, coded timing signal that comprises a train of pulses from which a typical impulse radio receiver employing the same code may demodulate and, if necessary, coherently integrate pulses to recover the transmitted information.

The impulse radio receiver is typically a direct conversion receiver with a cross correlator front-end that coherently converts an electromagnetic pulse train of monocycle pulses to a baseband signal in a single stage. The baseband signal is the basic information signal for the impulse radio communications system. A subcarrier may also be included with the baseband signal to reduce the effects of amplifier drift and low frequency noise. Typically, the subcarrier alternately reverses modulation according to a known pattern at a rate faster than the data rate. This same pattern is used to reverse the process and restore the original data pattern just before detection. This method permits alternating current (AC) coupling of stages, or equivalent signal processing, to eliminate direct current (DC) drift and errors from the detection process. This method is described in more detail in U.S. Pat. No. 5,677,927 to Fullerton et al.

Waveforms

Figure 1E:
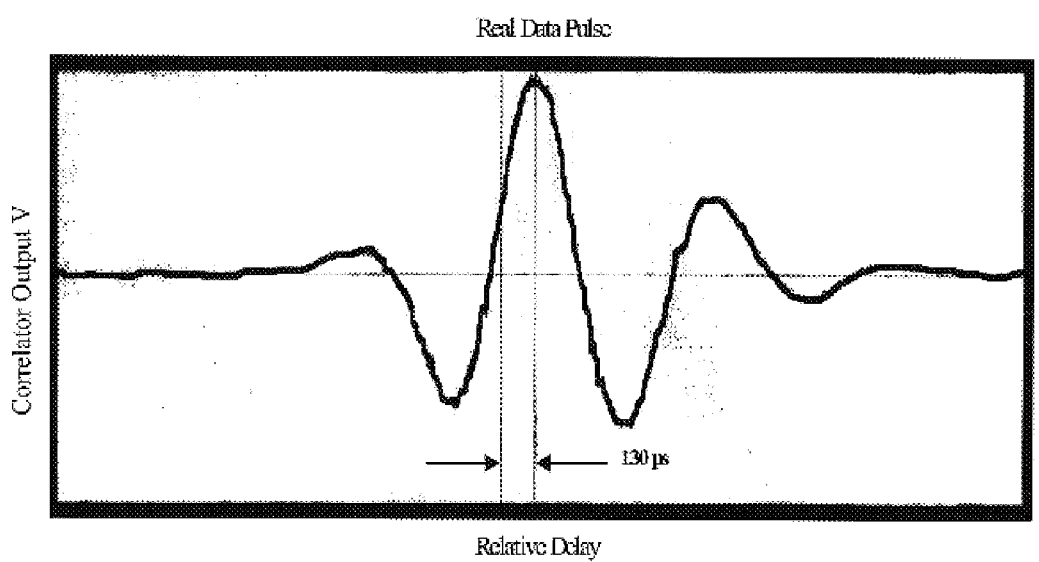
FIG. 1E illustrates an example of an actual pulse quadlet.

Impulse transmission systems are based on short, low duty-cycle pulses. Different pulse waveforms, or pulse types, may be employed to accommodate requirements of various applications. Typical pulse types include a Gaussian pulse, pulse doublet (also referred to as a Gaussian monocycle), pulse triplet, and pulse quadlet as depicted in FIGS. 1A through 1D, respectively. An actual received waveform that closely resembles the theoretical pulse quadlet is shown in FIG. 1E. A pulse type may also be a wavelet set produced by combining two or more pulse waveforms (e.g., a doublet/triplet wavelet set). These different pulse types may be produced by methods described in the patent documents referenced above or by other methods, as persons skilled in the art would understand.

For analysis purposes, it is convenient to model pulse waveforms in an ideal manner. For example, the transmitted waveform produced by supplying a step function into an ultra-wideband antenna may be modeled as a Gaussian monocycle. A Gaussian monocycle (normalized to a peak value of 1) may be described by:

$$f_{mono}(t) = \sqrt{e}\left(\frac{t}{\sigma}\right)e^{\frac{-t^2}{2\sigma^2}}$$

where σ ris a time scaling parameter, t is time, and e is the natural logarithm base.

Figure 1F:
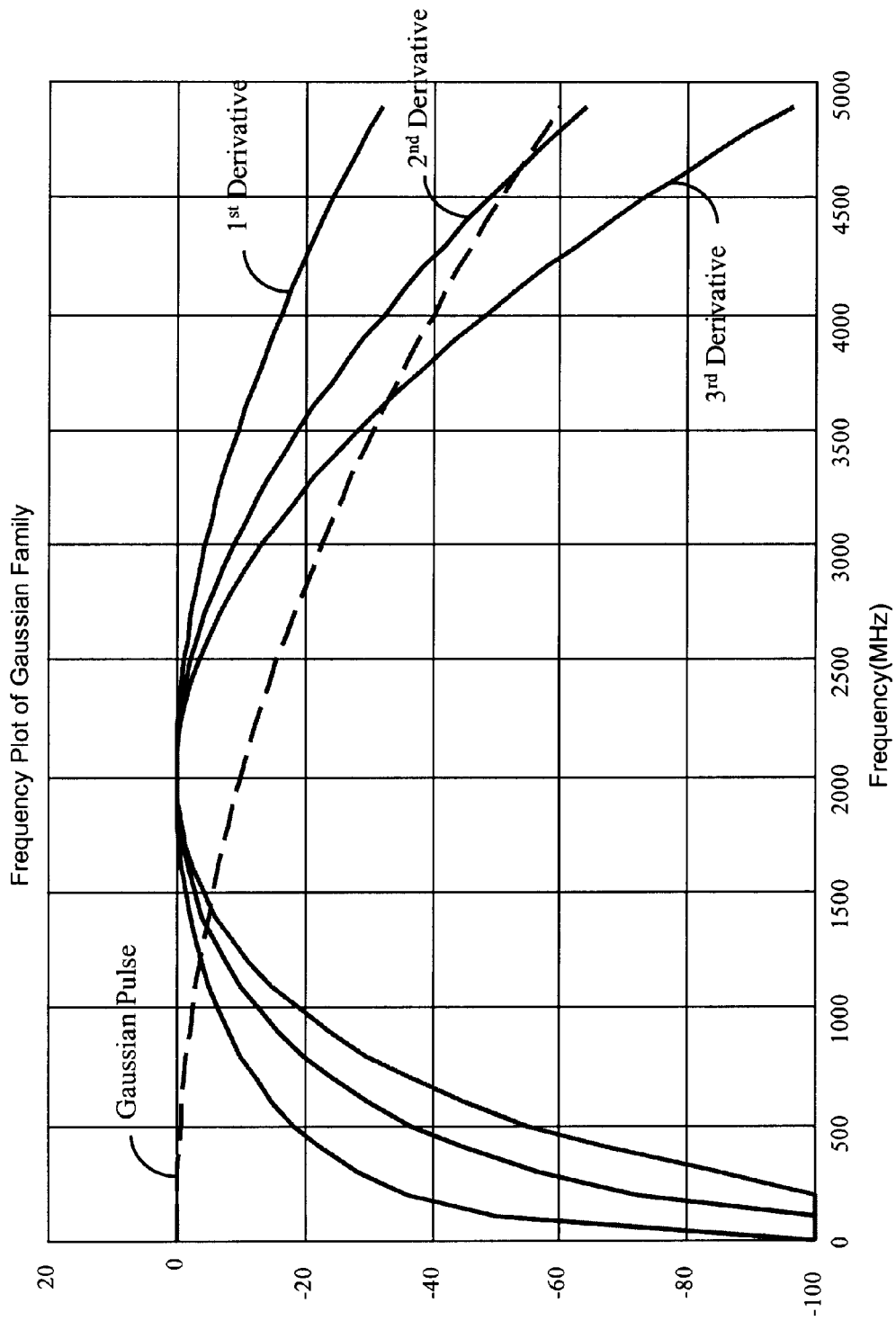
FIG. 1F illustrates a power spectral density of the Gaussian pulses of FIGS. 1A–1D.

The power special density of the Gaussian monocycle is shown in FIG. 1F, along with spectrums for the Gaussian pulse, triplet, and quadlet. The corresponding equation for the Gaussian monocycle is:

$$F_{mono}(f) = (2\pi)^{\frac{3}{2}}\sigma f e^{-2(\pi\sigma f)^2}$$

The center frequency ($f_c$) or frequency of peak spectral density, of the Gaussian monocycle is:

$$f_c = \frac{1}{2\pi\sigma}$$

It should be noted that the output of an ultra-wideband antenna is essentially equal to the derivative of its input. Accordingly, since the pulse doublet, pulse triplet, and pulse quadlet are the first, second, and third derivatives of the Gaussian pulse, in an ideal model, an antenna receiving a Gaussian pulse will transmit a Gaussian monocycle and an antenna receiving a Gaussian monocycle will provide a pulse triplet.

Pulse Trains

Figure 2A:
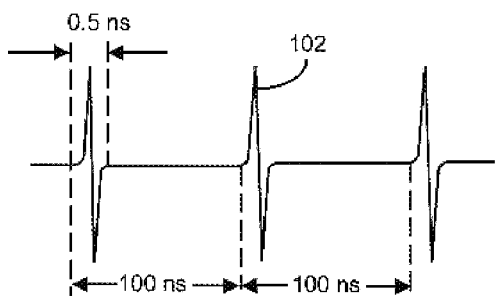
FIG. 2A illustrates a pulse train in the time domain.
Figure 2B:
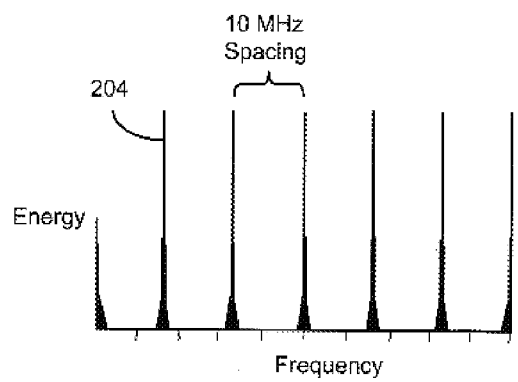
FIG. 2B illustrates a frequency domain amplitude of the pulse train of FIG. 2A.
Figure 2C:
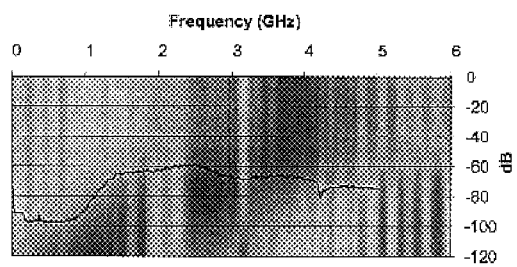
FIG. 2C illustrates a full spectrum of the pulse train of FIG. 2A.

Impulse transmission systems may communicate one or more data bits with a single pulse; however, typically each data bit is communicated using a sequence of pulses, known as a pulse train. As described in detail in the following example system, the impulse radio transmitter produces and outputs a train of pulses for each bit of information. FIGS. 2A and 2B are illustrations of the output of a typical 10 megapulses per second (Mpps) system with uncoded, unmodulated pulses, each having a width of 0.5 nanoseconds (ns). FIG. 2A shows a time domain representation of the pulse train output. FIG. 2B illustrates that the result of the pulse train in the frequency domain is to produce a spectrum comprising a set of comb lines spaced at the frequency of the 10 Mpps pulse repetition rate. When the full spectrum is shown, as in FIG. 2C, the envelope of the comb line spectrum corresponds to the curve of the single Gaussian monocycle spectrum in FIG. 1F. For this simple uncoded case, the power of the pulse train is spread among roughly two hundred comb lines. Each comb line thus has a small fraction of the total power and presents much less of an interference problem to a receiver sharing the band. It can also be observed from FIG. 2A that impulse transmission systems typically have very low average duty cycles, resulting in average power lower than peak power. The duty cycle of the signal in FIG. 2A is 0.5%, based on a 0.5 ns pulse duration in a 100 ns interval.

The signal of an uncoded, unmodulated pulse train may be expressed:

$$s(t) = (-1)^f a \sum_j \omega(ct - jT_f, b)$$

where j is the index of a pulse within a pulse train, $(-1)^f$ is polarity (+/−), a is pulse amplitude, b is pulse type, c is pulse width, $\omega(t,b)$ is the normalized pulse waveform, and $T_f$ is pulse repetition time.

The energy spectrum of a pulse train signal over a frequency bandwidth of interest may be determined by summing the phasors of the pulses at each frequency, using the following equation:

$$A(\omega) = \left| \sum_{i=1}^n \frac{e^{j\Delta t}}{n} \right|$$

where A ($\omega$) is the amplitude of the spectral response at a given frequency, $\omega$ is the frequency being analyzed ($2\pi f$), $\Delta t$ is the relative time delay of each pulse from the start of time period, and n is the total number of pulses in the pulse train.

A pulse train can also be characterized by its autocorrelation and cross-correlation properties. Autocorrelation properties pertain to the number of pulse coincidences (i.e., simultaneous arrival of pulses) that occur when a pulse train is correlated against an instance of itself that is offset in time. Of primary importance is the ratio of the number of pulses in the pulse train to the maximum number of coincidences that occur for any time offset across the period of the pulse train. This ratio is commonly referred to as the main-lobe-to-side-lobe ratio, where the greater the ratio, the easier it is to acquire and track a signal.

Cross-correlation properties involve the potential for pulses from two different signals simultaneously arriving, or coinciding, at a receiver. Of primary importance are the maximum and average numbers of pulse coincidences that may occur between two pulse trains. As the number of coincidences increases, the propensity for data errors increases. Accordingly, pulse train cross-correlation properties are used in determining channelization capabilities of impulse transmission systems (i.e., the ability to simultaneously operate within close proximity).

Coding

Figure 2D:
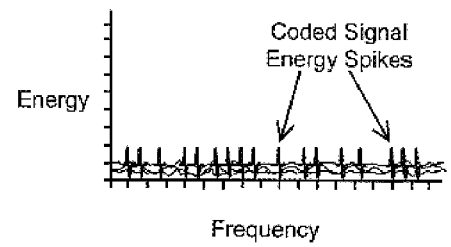
FIG. 2D illustrates application of a PN code to distribute energy of the pulses.

Specialized coding techniques can be employed to specify temporal and/or non-temporal pulse characteristics to produce a pulse train having certain spectral and/or correlation properties. For example, by employing a PN code to vary inter-pulse spacing, the energy in the comb lines presented in FIG. 2B can be distributed to other frequencies as depicted in FIG. 2D, thereby decreasing the peak spectral density within a bandwidth of interest. Note that the spectrum retains certain properties that depend on the specific (temporal) PN code used. Spectral properties can be similarly affected by using non-temporal coding (e.g., inverting certain pulses).

Figure 3:
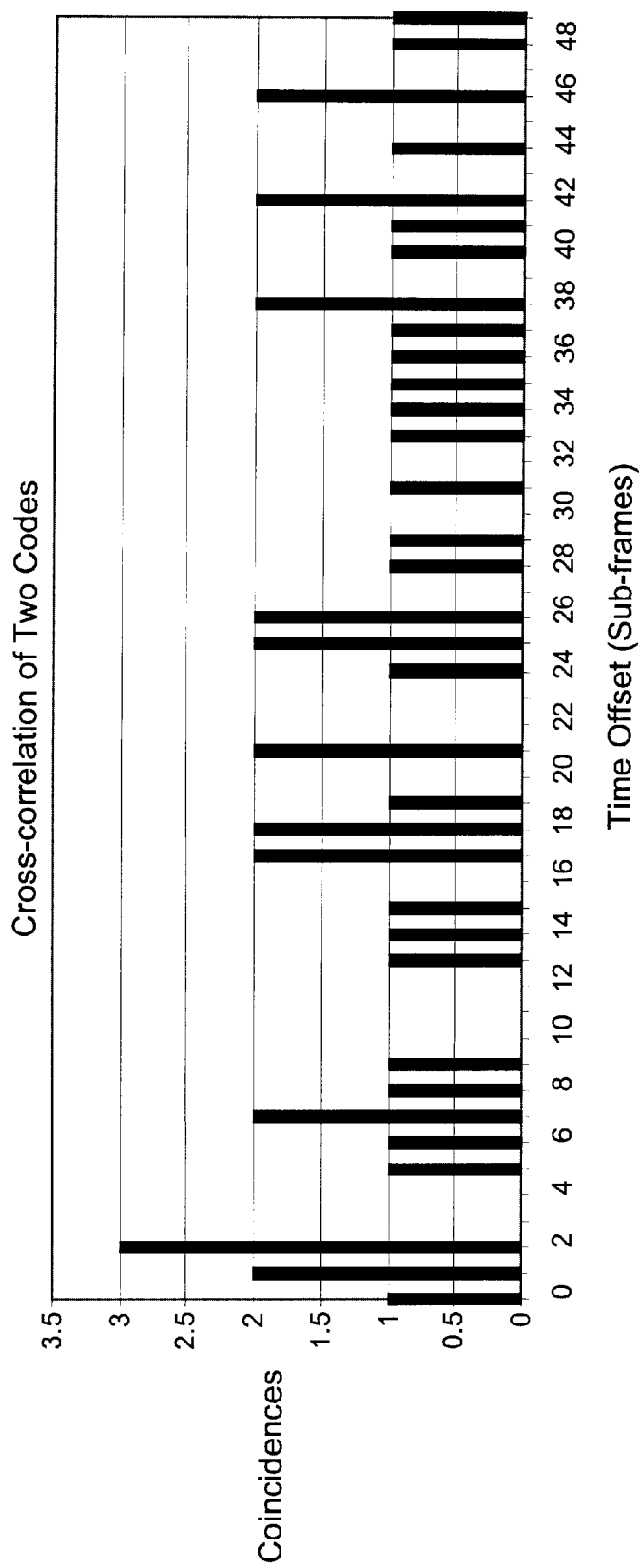
FIG. 3 illustrates cross-correlation properties of two PN codes.

Coding provides a method of establishing independent communication channels. Specifically, families of codes can be designed such that the number of pulse coincidences between pulse trains produced by any two codes will be minimal. For example, FIG. 3 depicts cross-correlation properties of two codes that have no more than four coincidences for any time offset. Generally, keeping the number of pulse collisions minimal represents a substantial attenuation of the unwanted signal.

Coding can also be used to facilitate signal acquisition. For example, coding techniques can be used to produce pulse trains with a desirable main-lobe-to-side-lobe ratio. In addition, coding can be used to reduce acquisition algorithm search space.

Coding methods for specifying temporal and non-temporal pulse characteristics are described in commonly owned, co-pending applications titled "A Method and Apparatus for Positioning Pulses in Time," application Ser. No. 09/592,249, and "A Method for Specifying Non-Temporal Pulse Characteristics," application Ser. No. 09/592,250, both filed Jun. 12, 2000, and both of which are incorporated herein by reference.

Typically, a code consists of a number of code elements having integer or floating-point values. A code element value may specify a single pulse characteristic or may be subdivided into multiple components, each specifying a different pulse characteristic. Code element or code component values typically map to a pulse characteristic value layout that may be fixed or non-fixed and may involve value ranges, discrete values, or a combination of value ranges and discrete values. A value range layout specifies a range of values that is divided into components that are each subdivided into subcomponents, which can be further subdivided, as desired. In contrast, a discrete value layout involves uniformly or non-uniformly distributed discrete values. A non-fixed layout (also referred to as a delta layout) involves delta values relative to some reference value. Fixed and non-fixed layouts, and approaches for mapping code element/component values, are described in co-owned, co-pending applications, titled "Method for Specifying Pulse Characteristics using Codes," application Ser. No. 09/592,290 and "A Method and Apparatus for Mapping Pulses to a Non-Fixed Layout," application Ser. No. 09/591,691, both filed on Jun. 12, 2000, both of which are incorporated herein by reference.

A fixed or non-fixed characteristic value layout may include a non-allowable region within which a pulse characteristic value is disallowed. A method for specifying non-allowable regions is described in co-owned, co-pending application titled "A Method for Specifying Non-Allowable Pulse Characteristics," application Ser. No. 09/592,289, filed Jun. 12, 2000, and incorporated herein by reference. A related method that conditionally positions pulses depending on whether code elements map to non-allowable regions is described in co-owned, co-pending application, titled "A Method and Apparatus for Positioning Pulses Using a Layout having Non-Allowable Regions," application Ser. No. 09/592,248 filed Jun. 12, 2000, and incorporated herein by reference.

The signal of a coded pulse train can be generally expressed by:

$$s_{tr}^{(k)}(t) = \sum_j (-1)^{f_j^{(k)}} a_j^{(k)} \omega\left(c_j^{(k)} t - T_j^{(k)}, b_j^{(k)}\right)$$

where k is the index of a transmitter, j is the index of a pulse within its pulse train, $(-1)f_j^{(k)}$, $a_j^{(k)}$, $b_j^{(k)}$, $c_j^{(k)}$, and $\omega(t, b_j^{(k)})$ are the coded polarity, pulse amplitude, pulse type, pulse width, and normalized pulse waveform of the jth pulse of the kth transmitter, and $T_j^{(k)}$ is the coded time shift of the jth pulse of the kth transmitter. Note: When a given non-temporal characteristic does not vary (i.e., remains constant for all pulses), it becomes a constant in front of the summation sign.

Various numerical code generation methods can be employed to produce codes having certain correlation and spectral properties. Such codes typically fall into one of two categories: designed codes and pseudorandom codes. A designed code may be generated using a quadratic congruential, hyperbolic congruential, linear congruential, Costas array, or other such numerical code generation technique designed to generate codes having certain correlation properties. A pseudorandom code may be generated using a computer's random number generator, binary shift-register(s) mapped to binary words, a chaotic code generation scheme, or the like. Such 'random-like' codes are attractive for certain applications since they tend to spread spectral energy over multiple frequencies while having 'good enough' correlation properties, whereas designed codes may have superior correlation properties but possess less suitable spectral properties. Detailed descriptions of numerical code generation techniques are included in a co-owned, co-pending patent application titled "A Method and Apparatus for Positioning Pulses in Time," application Ser. No. 09/592,248, filed Jun. 12, 2000, and incorporated herein by reference.

It may be necessary to apply predefined criteria to determine whether a generated code, code family, or a subset of a code is acceptable for use with a given UWB application. Criteria may include correlation properties, spectral properties, code length, non-allowable regions, number of code family members, or other pulse characteristics. A method for applying predefined criteria to codes is described in co-owned, co-pending application, titled "A Method and Apparatus for Specifying Pulse Characteristics using a Code that Satisfies Predefined Criteria," application Ser. No. 09/592,288, filed Jun. 12, 2000, and incorporated herein by reference.

In some applications, it may be desirable to employ a combination of codes. Codes may be combined sequentially, nested, or sequentially nested, and code combinations may be repeated. Sequential code combinations typically involve switching from one code to the next after the occurrence of some event and may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in particular spectral properties. A method for applying code combinations is described in co-owned, co-pending application, titled "A Method and Apparatus for Applying Codes Having Pre-Defined Properties," application Ser. No. 09/591,690, filed Jun. 12, 2000, and incorporated herein by reference.

Modulation

Various aspects of a pulse waveform may be modulated to convey information and to further minimize structure in the resulting spectrum. Amplitude modulation, phase modulation, frequency modulation, time-shift modulation and M-ary versions of these were proposed in U.S. Pat. No. 5,677,927 to Fullerton et al., previously incorporated by reference. Time-shift modulation can be described as shifting the position of a pulse either forward or backward in time relative to a nominal coded (or uncoded) time position in response to an information signal. Thus, each pulse in a train of pulses is typically delayed a different amount from its respective time base clock position by an individual code delay amount plus a modulation time shift. This modulation time shift is normally very small relative to the code shift. In a 10 Mpps system with a center frequency of 2 GHz, for example, the code may command pulse position variations over a range of 100 ns, whereas, the information modulation may shift the pulse position by 150 ps. This two-state 'early-late' form of time shift modulation is depicted in FIG. 4A.

A pulse train with conventional 'early-late' time-shift modulation can be expressed:

$$s_{tr}^{(k)}(t) = \sum_j (-1)^{f_j^{(k)}} a_j^{(k)} \omega\left(c_j^{(k)} t - T_j^{(k)} - \delta d_{\lfloor j/N_s \rfloor}^{(k)}, b_j^{(k)}\right)$$

where k is the index of a transmitter, j is the index of a pulse within its pulse train, $(-1)f_j^{(k)}$, $a_j^{(k)}$, $b_j^{(k)}$, $c_j^{(k)}$, and $\omega(t, b_j^{(k)})$ are the coded polarity, pulse amplitude, pulse type, pulse width, and normalized pulse waveform of the jth pulse of the kth transmitter, $T_j^{(k)}$ is the coded time shift of the jth pulse of the kth transmitter, $\delta$ is the time shift added when the transmitted symbol is 1 (instead of 0), $d^{(k)}$ is the data (i.e., 0 or 1) transmitted by the kth transmitter, and $N_s$ is the number of pulses per symbol (e.g., bit). Similar expressions can be derived to accommodate other proposed forms of modulation.

An alternative form of time-shift modulation can be described as One-of-Many Position Modulation (OMPM). The OMPM approach, shown in FIG. 4B, involves shifting a pulse to one of N possible modulation positions about a nominal coded (or uncoded) time position in response to an information signal, where N represents the number of possible states. For example, if N were four (4), two data bits of information could be conveyed. For further details regarding OMPM, see "Apparatus, System and Method for One-of-Many Position Modulation in an Impulse Radio Communication System," filed Jun. 7, 2000, assigned to the assignee of the present invention, and incorporated herein by reference.

An impulse radio communications system can employ flip modulation techniques to convey information. The simplest flip modulation technique involves transmission of a pulse or an inverted (or flipped) pulse to represent a data bit of information, as depicted in FIG. 4C. Flip modulation techniques may also be combined with time-shift modulation techniques to create two, four, or more different data states. One such flip with shift modulation technique is referred to as Quadrature Flip Time Modulation (QFTM). The QFTM approach is illustrated in FIG. 4D. Flip modulation techniques are further described in patent application titled "Apparatus, System and Method for Flip Modulation in an Impulse Radio Communication System," application Ser. No. 09/537,692, filed Mar. 29, 2000, assigned to the assignee of the present invention, and incorporated herein by reference.

Vector modulation techniques may also be used to convey information. Vector modulation includes the steps of generating and transmitting a series of time-modulated pulses, each pulse delayed by one of at least four predetermined time delay periods and representative of at least two data bits of information, and receiving and demodulating the series of time-modulated pulses to estimate the data bits associated with each pulse. Vector modulation is shown in FIG. 4E. Vector modulation techniques are further described in patent application titled "Vector Modulation System and Method for Wideband Impulse Radio Communications," application Ser. No. 09/169,765, filed Dec. 9, 1999, assigned to the assignee of the present invention, and incorporated herein by reference.

Reception and Demodulation

Figure 5A:
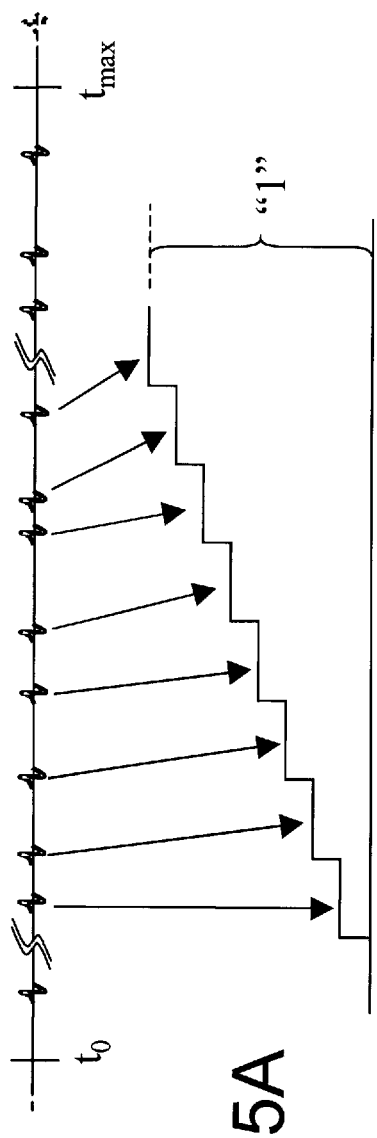
FIG. 5A shows an ideal long-term integration up-ramp corresponding to a bit "1"
Figure 5B:
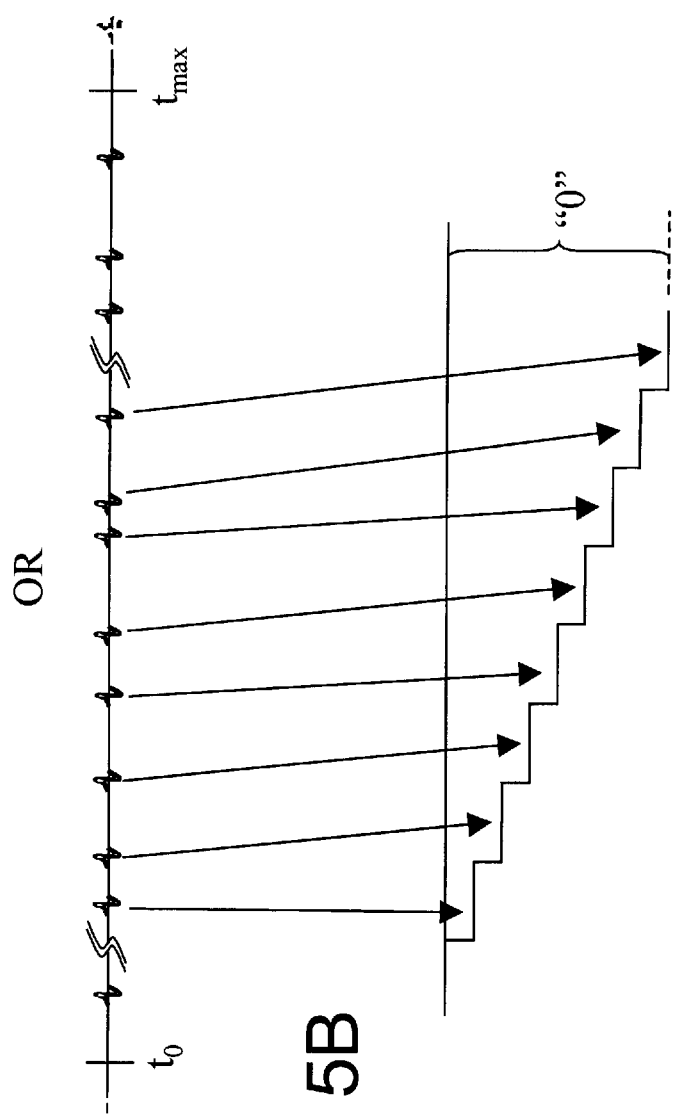
FIG. 5B shows an ideal long-term integration down-ramp corresponding to a bit "0"
Figure 6A:
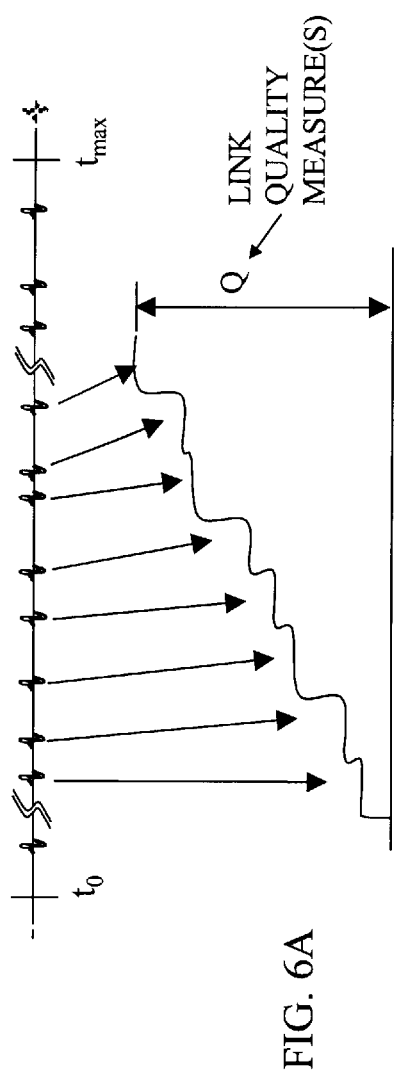
FIG. 6A shows proximate shape of an up-ramp in the presence of interference and noise.
Figure 6B:
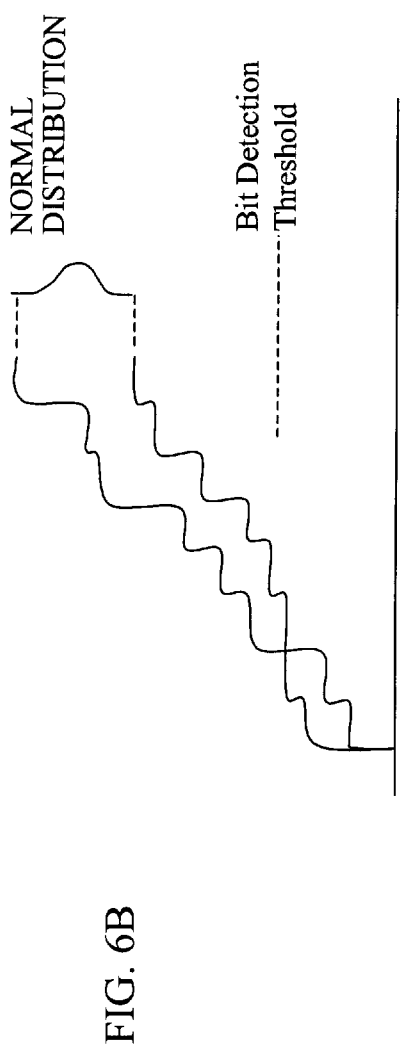
FIG. 6B shows normal distribution of peak points of a number of up-ramps.

Impulse radio systems operating within close proximity to each other may cause mutual interference. While coding minimizes mutual interference, the probability of pulse collisions increases as the number of coexisting impulse radio systems rises. Additionally, various other signals may be present that cause interference. Impulse radios can operate in the presence of mutual interference and other interfering signals, in part because they do not depend on receiving every transmitted pulse. Impulse radio receivers perform a correlating, synchronous receiving function (at the RF level) that uses statistical sampling and combining, or integration, of many pulses to recover transmitted information. Typically, a number of pulses, for example, 1 to 1000 or more pulses, are integrated to yield a single data bit (also known as long-term integration) thus diminishing the impact of individual pulse collisions, where the number of pulses that must be integrated to successfully recover transmitted information depends on a number of variables including pulse rate, bit rate, range and interference levels. FIGS. 5A and 5B depict correlated pulses being integrated equally under ideal conditions, i.e., without the presence of interference and noise. FIG. 5A shows the long-term integration process for pulses coded that produce an up-ramp corresponding to a bit "1". Similarly, FIG. 5B shows the long-term integration process for pulses coded that produce a down-ramp corresponding to a bit "0". Under real operating conditions, the presence of interference and noise would cause the pulses to integrate unequally. FIG. 6A shows the proximate shape of an up-ramp in the presence of interference and noise where the pulses have integrated unequally. Because of unequal integration in the presence of interference and noise, the resulting long-term integrations of multiple binary bits has a normal distribution. FIG. 6B illustrates that peak points of the up-ramps representing binary bit 1 follow a normal distribution curve. Although not shown, the same principal holds true for the long-term integrations that result in down-ramps representing binary bits 0. In order to detect the received binary bits reliably, bit detection thresholds are selected to accommodate such normal distribution based on predefined statistical parameters. A detection threshold is depicted in FIG. 6B.

Interference Resistance

Besides providing channelization and energy smoothing, coding makes impulse radios highly resistant to interference by enabling discrimination between intended impulse transmissions and interfering transmissions. This property is desirable since impulse radio systems must share the energy spectrum with conventional radio systems and with other impulse radio systems.

Figure 7A:
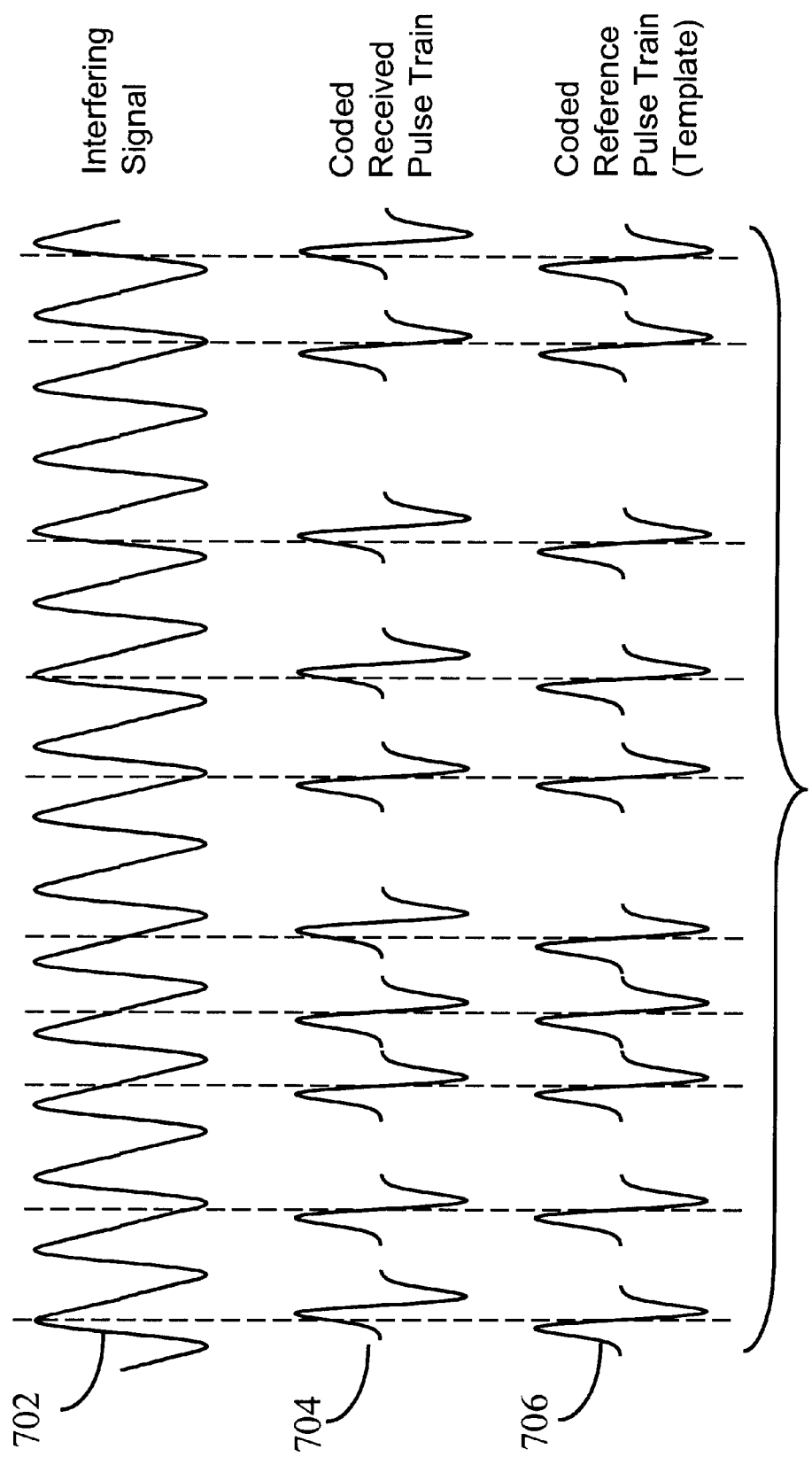
FIG. 7A illustrates the result of a narrow band sinusoidal interference signal overlaying an impulse radio signal.

FIG. 7A illustrates the result of a narrow band sinusoidal interference signal 702 overlaying an impulse radio signal 704. At the impulse radio receiver, the input to the cross correlation would include the narrow band signal 702 and the received ultrawide-band impulse radio signal 704. The input is sampled by the cross correlator using a template signal 706 positioned in accordance with a code. Without coding, the cross correlation would sample the interfering signal 702 with such regularity that the interfering signals could cause interference to the impulse radio receiver. However, when the transmitted impulse signal is coded and the impulse radio receiver template signal 706 is synchronized using the identical code, the receiver samples the interfering signals non-uniformly. The samples from the interfering signal add incoherently, increasing roughly according to the square root of the number of samples integrated. The impulse radio signal samples, however, add coherently, increasing directly according to the number of samples integrated. Thus, integrating over many pulses overcomes the impact of interference.

Processing Gain

Impulse radio systems have exceptional processing gain due to their wide spreading bandwidth. For typical spread spectrum systems, the definition of processing gain, which quantifies the decrease in channel interference when wideband communications are used, is the ratio of the bandwidth of the channel to the bit rate of the information signal. For example, a direct sequence spread spectrum system with a 10 KHz information bandwidth and a 10 MHz channel bandwidth yields a processing gain of 1000, or 30 dB. However, far greater processing gains are achieved by impulse radio systems, where the same 10 KHz information bandwidth is spread across a much greater 2 GHz channel bandwidth, resulting in a theoretical processing gain of 200,000, or 53 dB.

Capacity

It can be shown theoretically, using signal-to-noise arguments, that thousands of simultaneous channels are available to an impulse radio system as a result of its exceptional processing gain.

The average output signal-to-noise ratio of the impulse radio may be calculated for randomly selected time-hopping codes as a function of the number of active users, $N_u$, as:

$$SNR_{out}(N_u) = \frac{(N_s A_1 m_p)^2}{\sigma_{rec}^2 + N_s \sigma_a^2 \sum_{k=2}^{N_u} A_k^2}$$

where $N_s$ is the number of pulses integrated per bit of information, $A_k$ models the attenuation of transmitter k's signal over the propagation path to the receiver, and $\sigma_{rec}^2$ is the variance of the receiver noise component at the pulse train integrator output. The monocycle waveform-dependent parameters $m_p$ and $\sigma_\alpha^2$ are given by $$m_p = \int_{-\infty}^{\infty} \omega(t)[\omega(t) - \omega(t-\delta)]dt \text{ and}$$

$$\sigma_a^2 = T_f^{-1} \int_{-\infty}^{\infty} \left[\int_{-\infty}^{\infty} \omega(t-s)v(t)dt\right]^2 ds,$$

where $\omega(t)$ is the monocycle waveform, $v(t)=\omega(t)-\omega(t-\delta)$ is the template signal waveform, $\delta$ is the time shift between the monocycle waveform and the template signal waveform, $T_f$ is the pulse repetition time, and s is signal.

Multipath and Propagation

One of the advantages of impulse radio is its resistance to multipath fading effects. Conventional narrow band systems are subject to multipath through the Rayleigh fading process, where the signals from many delayed reflections combine at the receiver antenna according to their seemingly random relative phases resulting in possible summation or possible cancellation, depending on the specific propagation to a given location. Multipath fading effects are most adverse where a direct path signal is weak relative to multipath signals, which represents the majority of the potential coverage area of a radio system. In a mobile system, received signal strength fluctuates due to the changing mix of multipath signals that vary as its position varies relative to fixed transmitters, mobile transmitters and signal-reflecting surfaces in the environment.

Impulse radios, however, can be substantially resistant to multipath effects. Impulses arriving from delayed multipath reflections typically arrive outside of the correlation time and, thus, may be ignored. This process is described in detail with reference to FIGS. 7B and 7C. FIG. 7B illustrates a typical multipath situation, such as in a building, where there are many reflectors 704B, 705B. In this figure, a transmitter 706B transmits a signal that propagates along three paths, the direct path 701B, path 1 702B, and path2 703B, to a receiver 708B, where the multiple reflected signals are combined at the antenna. The direct path 701B, representing the straight-line distance between the transmitter and receiver, is the shortest. Path 1 702B represents a multipath reflection with a distance very close to that of the direct path. Path 2 703B represents a multipath reflection with a much longer distance. Also shown are elliptical (or, in space, ellipsoidal) traces that represent other possible locations for reflectors that would produce paths having the same distance and thus the same time delay.

FIG. 7C illustrates the received composite pulse waveform resulting from the three propagation paths 701B, 702B, and 703B shown in FIG. 7B. In this figure, the direct path signal 701B is shown as the first pulse signal received. The path 1 and path 2 signals 702B, 703B comprise the remaining multipath signals, or multipath response, as illustrated. The direct path signal is the reference signal and represents the shortest propagation time. The path 1 signal is delayed slightly and overlaps and enhances the signal strength at this delay value. The path 2 signal is delayed sufficiently that the waveform is completely separated from the direct path signal. Note that the reflected waves are reversed in polarity. If the correlator template signal is positioned such that it will sample the direct path signal, the path 2 signal will not be sampled and thus will produce no response. However, it can be seen that the path 1 signal has an effect on the reception of the direct path signal since a portion of it would also be sampled by the template signal. Generally, multipath signals delayed less than one quarter wave (one quarter wave is about 1.5 inches, or 3.5 cm at 2 GHz center frequency) may attenuate the direct path signal. This region is equivalent to the first Fresnel zone in narrow band systems. Impulse radio, however, has no further nulls in the higher Fresnel zones. This ability to avoid the highly variable attenuation from multipath gives impulse radio significant performance advantages.

Figure 7D:
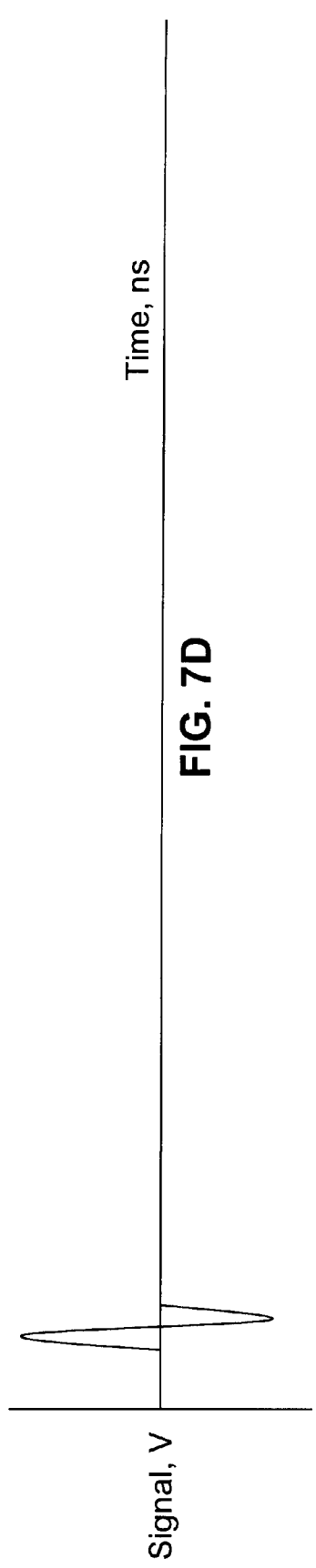
FIGS. 7D–7F represent the received signal from a TM-UWB transmitter in three different multipath environments.
Figure 7E:
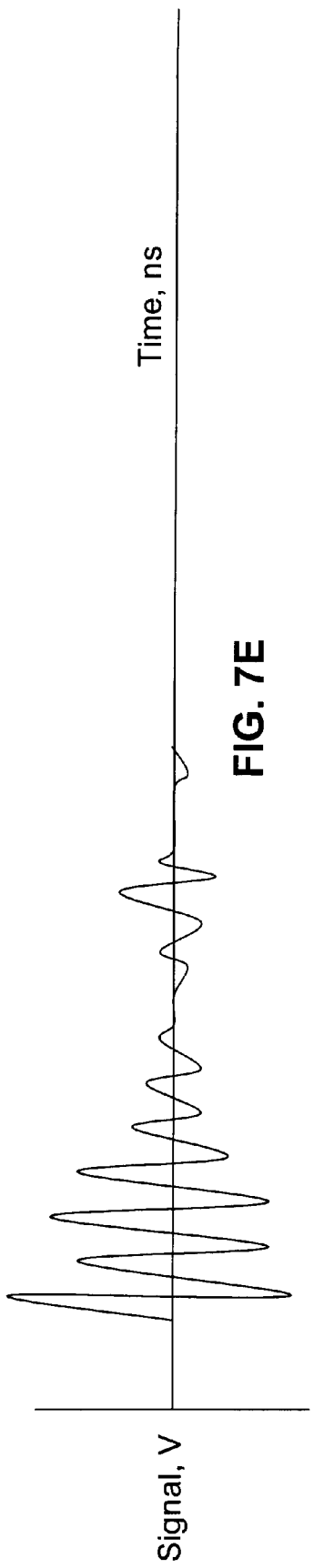
Figure 7F:
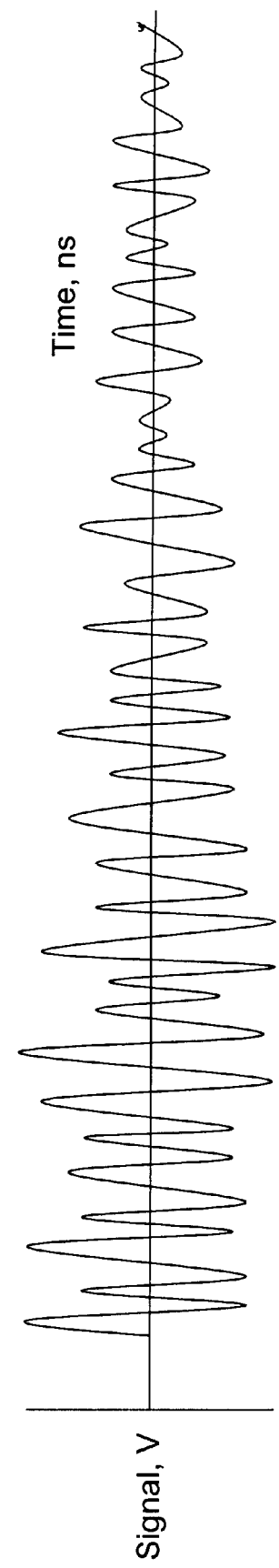

FIGS. 7D, 7E, and 7F represent the received signal from a TM-UWB transmitter in three different multipath environments. These figures are approximations of typical signal plots. FIG. 7D illustrates the received signal in a very low multipath environment. This may occur in a building where the receiver antenna is in the middle of a room and is a relatively short, distance, for example, one meter, from the transmitter. This may also represent signals received from a larger distance, such as 100 meters, in an open field where there are no objects to produce reflections. In this situation, the predominant pulse is the first received pulse and the multipath reflections are too weak to be significant. FIG. 7E illustrates an intermediate multipath environment. This approximates the response from one room to the next in a building. The amplitude of the direct path signal is less than in FIG. 7D and several reflected signals are of significant amplitude. FIG. 7F approximates the response in a severe multipath environment such as propagation through many rooms, from corner to corner in a building, within a metal cargo hold of a ship, within a metal truck trailer, or within an intermodal shipping container. In this scenario, the main path signal is weaker than in FIG. 7E. In this situation, the direct path signal power is small relative to the total signal power from the reflections.

Figure 7G:
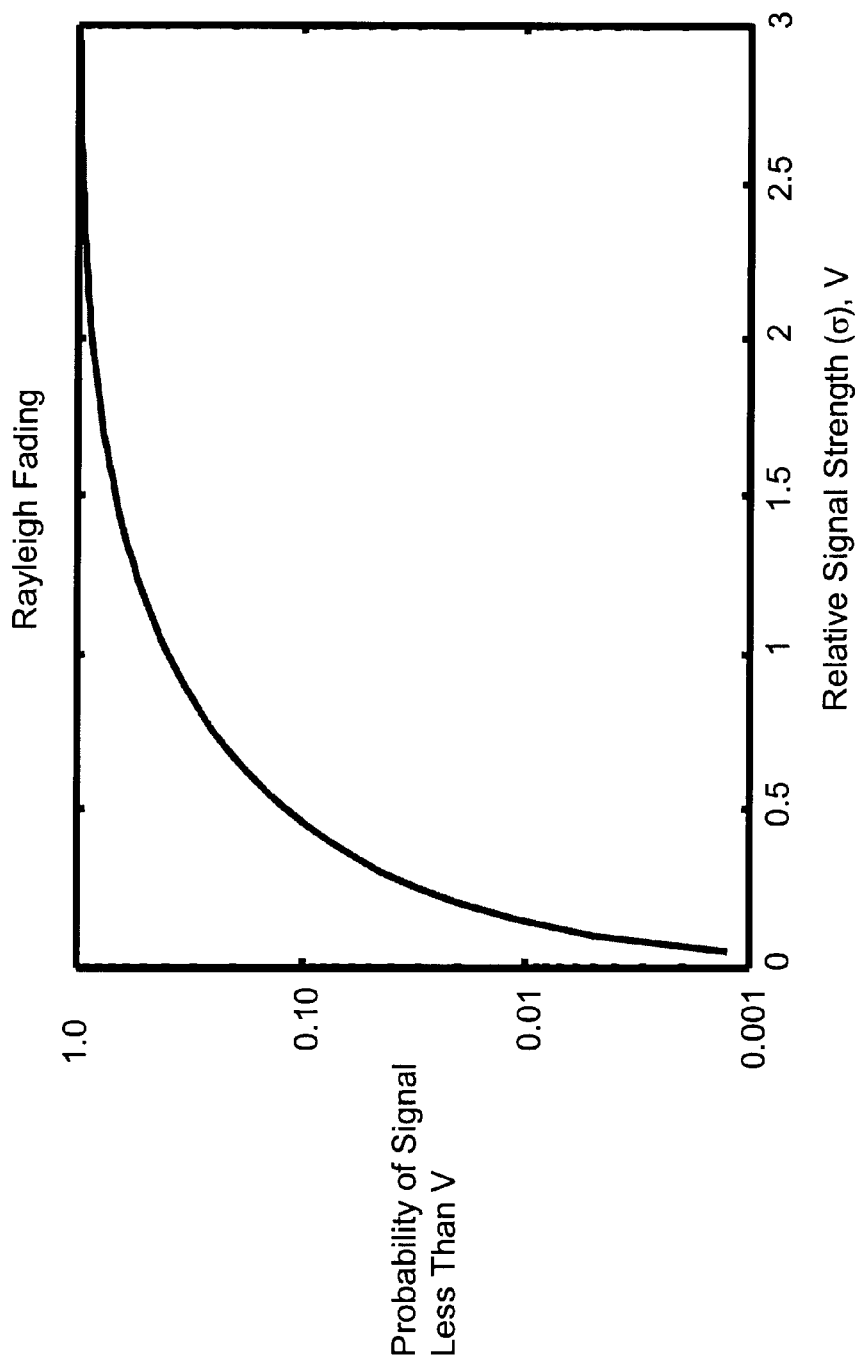
FIG. 7G illustrates a Rayleigh distribution curve for a typical multi-path environment.

An impulse radio receiver can receive the signal and demodulate the information using either the direct path signal or any multipath signal peak having sufficient signal-to-noise ratio. Thus, the impulse radio receiver can select the strongest response from among the many arriving signals. In order for the multipath signals to cancel and produce a null at a given location, dozens of reflections would have to be cancelled simultaneously and precisely while blocking the direct path, which is a highly unlikely scenario. This time separation of mulitipath signals together with time resolution and selection by the receiver permit a type of time diversity that virtually eliminates cancellation of the signal. In a multiple correlator rake receiver, performance is further improved by collecting the signal power from multiple signal peaks for additional signal-to-noise performance.

Where the system of FIG. 7B is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and $\sigma(2)^{1/2}$ is the RMS power of the combined multipath signals. The Rayleigh distribution curve in FIG. 7G shows that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 7H:
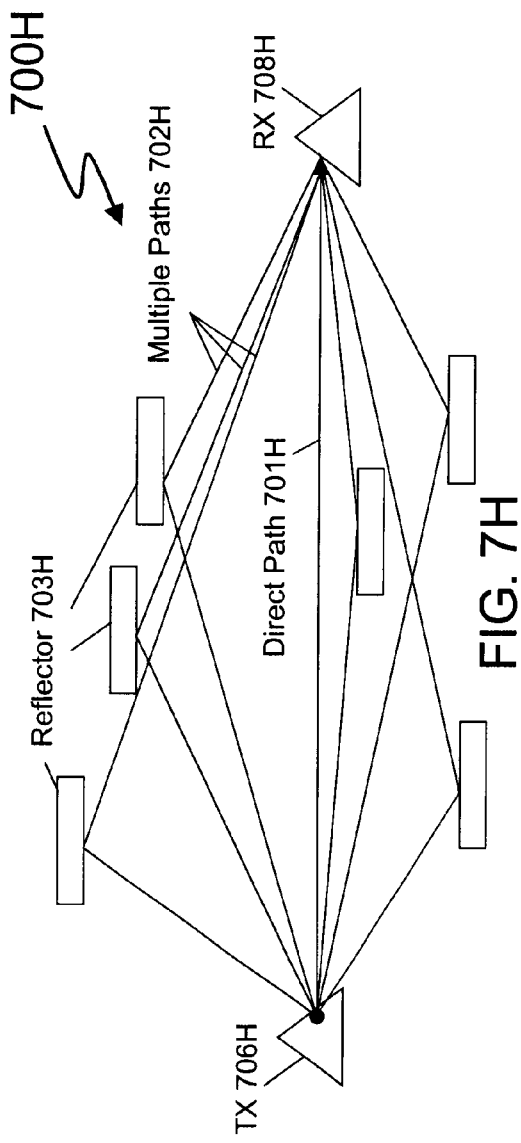
FIG. 7H illustrates an impulse radio system in a high multipath environment.
Figure 7I:
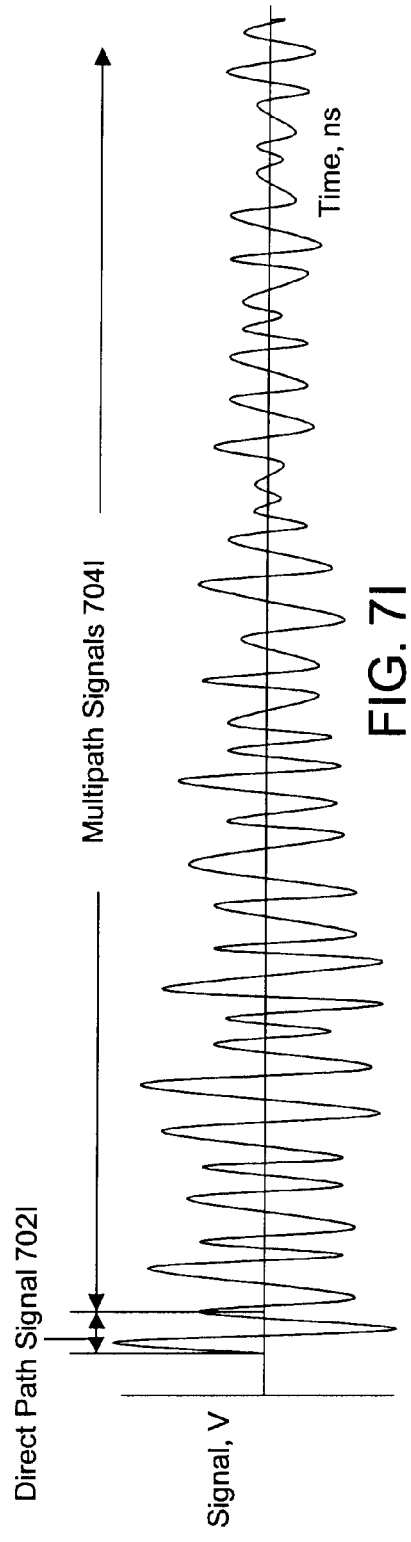
FIG. 7I illustrates the combined signal received in FIG. 5H over time.

In a high multipath environment such as inside homes, offices, warehouses, automobiles, trailers, shipping containers, or outside in an urban canyon or other situations where the propagation is such that the received signal is primarily scattered energy, impulse radio systems can avoid the Rayleigh fading mechanism that limits performance of narrow band systems, as illustrated in FIGS. 7H and 7I. FIG. 7H depicts an impulse radio system in a high multipath environment 700H consisting of a transmitter 706H and a receiver 708H. A transmitted signal follows a direct path 701H and reflects off reflectors 703H via multiple paths 702H. FIG. 7I illustrates the combined signal received by the receiver 708H over time with the vertical axis being signal strength in volts and the horizontal axis representing time in nanoseconds. The direct path 701H results in the direct path signal 702I while the multiple paths 702H result in multipath signals 704I. In the same manner described earlier for FIGS. 7B and 7C, the direct path signal 702I is sampled, while the multipath signals 704I are not, resulting in Rayleigh fading avoidance.

Distance Measurement and Positioning

Impulse systems can measure distances to relatively fine resolution because of the absence of ambiguous cycles in the received waveform. Narrow band systems, on the other hand, are limited to the modulation envelope and cannot easily distinguish precisely which RF cycle is associated with each data bit because the cycle-to-cycle amplitude differences are so small they are masked by link or system noise. Since an impulse radio waveform has no multi-cycle ambiguity, it is possible to determine waveform position to less than a wavelength, potentially down to the noise floor of the system. This time position measurement can be used to measure propagation delay to determine link distance to a high degree of precision. For example, 30 ps of time transfer resolution corresponds to approximately centimeter distance resolution. See, for example, U.S. Pat. No. 6,133,876, issued Oct. 17, 2000, titled "System and Method for Position Determination by Impulse Radio," and U.S. Pat. No. 6,111,536, issued Aug. 29, 2000, titled "System and Method for Distance Measurement by Inphase and Quadrature Signals in a Radio System," both of which are incorporated herein by reference.

In addition to the methods articulated above, impulse radio technology along with Time Division Multiple Access algorithms and Time Domain packet radios can achieve geo-positioning capabilities in a radio network. This geo-positioning method is described in co-owned, co-pending application titled "System and Method for Person or Object Position Location Utilizing Impulse Radio," application Ser. No. 09/456,409, filed Dec. 8, 1999, and incorporated herein by reference.

Power Control

Power control systems comprise a first transceiver that transmits an impulse radio signal to a second transceiver. A power control update is calculated according to a performance measurement of the signal received at the second transceiver. The transmitter power of either transceiver, depending on the particular setup, is adjusted according to the power control update. Various performance measurements are employed to calculate a power control update, including bit error rate, signal-to-noise ratio, and received signal strength, used alone or in combination. Interference is thereby reduced, which may improve performance where multiple impulse radios are operating in close proximity and their transmissions interfere with one another. Reducing the transmitter power of each radio to a level that produces satisfactory reception increases the total number of radios that can operate in an area without saturation. Reducing transmitter power also increases transceiver efficiency.

For greater elaboration of impulse radio power control, see patent application titled "System and Method for Impulse Radio Power Control," application Ser. No. 09/332,501, filed Jun. 14, 1999, assigned to the assignee of the present invention, and incorporated herein by reference.

Mitigating Effects of Interference

A method for mitigating interference in impulse radio systems comprises the steps of conveying the message in packets, repeating conveyance of selected packets to make up a repeat package, and conveying the repeat package a plurality of times at a repeat period greater than twice the period of occurrence of the interference. The communication may convey a message from a proximate transmitter to a distal receiver, and receive a message by a proximate receiver from a distal transmitter. In such a system, the method comprises the steps of providing interference indications by the distal receiver to the proximate transmitter, using the interference indications to determine predicted noise periods, and operating the proximate transmitter to convey the message according to at least one of the following: (1) avoiding conveying the message during noise periods, (2) conveying the message at a higher power during noise periods, (3) increasing error detection coding in the message during noise periods, (4) re-transmitting the message following noise periods, (5) avoiding conveying the message when interference is greater than a first strength, (6) conveying the message at a higher power when the interference is greater than a second strength, (7) increasing error detection coding in the message when the interference is greater than a third strength, and (8) re-transmitting a portion of the message after interference has subsided to less than a predetermined strength.

For greater elaboration of mitigating interference in impulse radio systems, see the patent application titled "Method for Mitigating Effects of Interference in Impulse Radio Communication," application Ser. No. 09/587,033, filed Jun. 2, 1999, assigned to the assignee of the present invention, and incorporated herein by reference.

Moderating Interference in Equipment Control Applications

Yet another improvement to impulse radio includes moderating interference with impulse radio wireless control of an appliance. The control is affected by a controller remote from the appliance which transmits impulse radio digital control signals to the appliance. The control signals have a transmission power and a data rate. The method comprises the steps of establishing a maximum acceptable noise value for a parameter relating to interfering signals and a frequency range for measuring the interfering signals, measuring the parameter for the interference signals within the frequency range, and effecting an alteration of transmission of the control signals when the parameter exceeds the maximum acceptable noise value.

For greater elaboration of moderating interference while effecting impulse radio wireless control of equipment, see patent application titled "Method and Apparatus for Moderating Interference While Effecting Impulse Radio Wireless Control of Equipment," application Ser. No. 09/586,163, filed Jun. 2, 1999, and assigned to the assignee of the present invention, and incorporated herein by reference.

Exemplary Transceiver Implementation

Transmitter

An exemplary embodiment of an impulse radio transmitter 802 of an impulse radio communication system having an optional subcarrier channel will now be described with reference to FIG. 8.

The transmitter 802 comprises a time base 804 that generates a periodic timing signal 806. The time base 804 typically comprises a voltage controlled oscillator (VCO), or the like, having a high timing accuracy and low jitter, on the order of picoseconds (Ps). The control voltage to adjust the VCO center frequency is set at calibration to the desired center frequency used to define the transmitter's nominal pulse repetition rate. The periodic timing signal 806 is supplied to a precision timing generator 808.

The precision timing generator 808 supplies synchronizing signals 810 to the code source 812 and utilizes the code source output 814, together with an optional, internally generated subcarrier signal, and an information signal 816, to generate a modulated, coded timing signal 818.

An information source 820 supplies the information signal 816 to the precision timing generator 808. The information signal 816 can be any type of intelligence, including digital bits representing voice, data, imagery, or the like, analog signals, or complex signals.

A pulse generator 822 uses the modulated, coded timing signal 818 as a trigger signal to generate output pulses. The output pulses are provided to a transmit antenna 824 via a transmission line 826 coupled thereto. The output pulses are converted into propagating electromagnetic pulses by the transmit antenna 824. The electromagnetic pulses are called the emitted signal, and propagate to an impulse radio receiver 702, such as shown in FIG. 7, through a propagation medium. In a preferred embodiment, the emitted signal is wide-band or ultrawide-band, approaching a monocycle pulse as in FIG. 1B. However, the emitted signal may be spectrally modified by filtering of the pulses, which may cause them to have more zero crossings (more cycles) in the time domain, requiring the radio receiver to use a similar waveform as the template signal for efficient conversion.

Receiver

An exemplary embodiment of an impulse radio receiver (hereinafter called the receiver) for the impulse radio communication system is now described with reference to FIG. 9.

The receiver 902 comprises a receive antenna 904 for receiving a propagated impulse radio signal 906. A received signal 908 is input to a cross correlator or sampler 910, via a receiver transmission line, coupled to the receive antenna 904. The cross correlation 910 produces a baseband output 912.

The receiver 902 also includes a precision timing generator 914, which receives a periodic timing signal 916 from a receiver time base 918. This time base 918 may be adjustable and controllable in time, frequency, or phase, as required by the lock loop in order to lock on the received signal 908. The precision timing generator 914 provides synchronizing signals 920 to the code source 922 and receives a code control signal 924 from the code source 922. The precision timing generator 914 utilizes the periodic timing signal 916 and code control signal 924 to produce a coded timing signal 926. The template generator 928 is triggered by this coded timing signal 926 and produces a train of template signal pulses 930 ideally having waveforms substantially equivalent to each pulse of the received signal 908. The code for receiving a given signal is the same code utilized by the originating transmitter to generate the propagated signal. Thus, the timing of the template pulse train matches the timing of the received signal pulse train, allowing the received signal 908 to be synchronously sampled in the correlator 910. The correlator 910 preferably comprises a multiplier followed by a short term integrator to sum the multiplier product over the pulse interval.

The output of the correlator 910 is coupled to a subcarrier demodulator 932, which demodulates the subcarrier information signal from the optional subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 934. A digital system embodiment is shown in FIG. 9. In this digital system, a sample and hold 936 samples the output 935 of the pulse summation stage 934 synchronously with the completion of the summation of a digital bit or symbol. The output of sample and hold 936 is then compared with a nominal zero (or reference) signal output in a detector stage 938 to provide an output signal 939 representing the digital state of the output voltage of sample and hold 936.

The baseband signal 912 is also input to a lowpass filter 942 (also referred to as lock loop filter 942). A control loop comprising the lowpass filter 942, time base 918, precision timing generator 914, template generator 928, and correlator 910 is used to generate an error signal 944. The error signal 944 provides adjustments to the adjustable time base 918 to position in time the periodic timing signal 926 in relation to the position of the received signal 908.

In a transceiver embodiment, substantial economy can be achieved by sharing part or all of several of the functions of the transmitter 602 and receiver 902. Some of these include the time base 918, precision timing generator 914, code source 922, antenna 904, and the like.

Figure 10A:
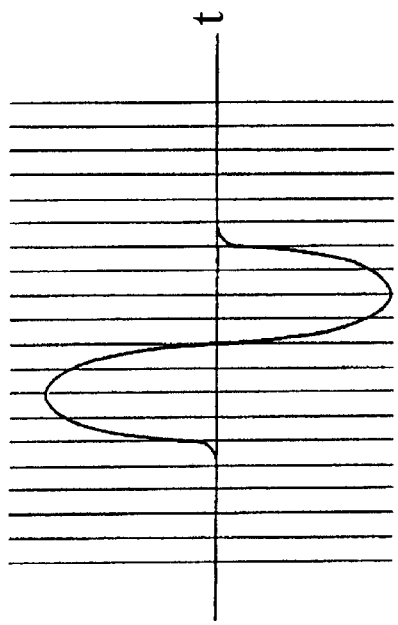
FIG. 10A illustrates a waveform of a template signal.
Figure 10B:
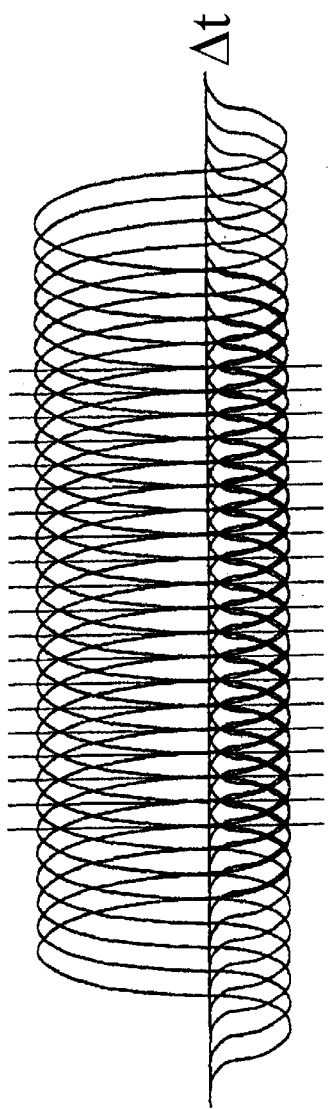
FIG. 10B illustrates the waveform of a received impulse radio signal at a set of several possible time offsets.
Figure 10C:
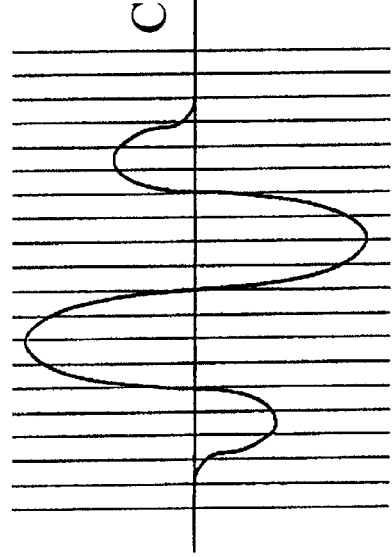
FIG. 10C represents the output of the cross correlator for each of the time offsets of FIG. 10B.

FIGS. 10A–10C illustrate the cross correlation process and the correlation function. FIG. 10A shows the waveform of a template signal. FIG. 10B shows the waveform of a received impulse radio signal at a set of several possible time offsets. FIG. 10C represents the output of the cross correlator for each of the time offsets of FIG. 10B. For any given pulse received, there is a corresponding point that is applicable on this graph. This is the point corresponding to the time offset of the template signal used to receive that pulse. Further examples and details of precision timing can be found described in U.S. Pat. No. 5,677,927, and commonly owned co-pending application application Ser. No. 09/146,524, filed Sep. 3, 1998, titled "Precision Timing Generator System and Method," both of which are incorporated herein by reference.

Because of the unique nature of impulse radio receivers, several modifications have been recently made to enhance system capabilities. Modifications include the utilization of multiple correlators to measure the impulse response of a channel to the maximum communications range of the system and to capture information on data symbol statistics. Further, multiple correlators enable rake pulse correlation techniques, more efficient acquisition and tracking implementations, various modulation schemes, and collection of time-calibrated pictures of received waveforms. For greater elaboration of multiple correlator techniques, see patent application titled "System and Method of using Multiple Correlator Receivers in an Impulse Radio System", application Ser. No. 09/537,264, filed Mar. 29, 2000, assigned to the assignee of the present invention, and incorporated herein by reference.

Methods to improve the speed at which a receiver can acquire and lock onto an incoming impulse radio signal have been developed. In one approach, a receiver includes an adjustable time base to output a sliding periodic timing signal having an adjustable repetition rate and a decode timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in more detail in U.S. Pat. No. 5,832,035 to Fullerton, incorporated herein by reference.

In another approach, a receiver obtains a template pulse train and a received impulse radio signal. The receiver compares the template pulse train and the received impulse radio signal. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, see the patent application titled "Method and System for Fast Acquisition of Ultra Wideband Signals," application Ser. No. 09/538,292, filed Mar. 29, 2000, assigned to the assignee of the present invention, and incorporated herein by reference.

A receiver has been developed that includes a baseband signal converter device and combines multiple converter circuits and an RF amplifier in a single integrated circuit package. For greater elaboration of this receiver, see the patent application titled "Baseband Signal Converter for a Wideband Impulse Radio Receiver," application Ser. No. 09/356,384, filed Jul. 16, 1999, assigned to the assignee of the present invention, and incorporated herein by reference.

Pulse Interleaving

The following description of the invention relates to a method and apparatus for receiving time spaced signals such as pulses, bursts, and the like. For the sake of clarity, references are mostly made to 'pulses'. However, the word 'pulse' can generally be interchanged with the word 'burst'. Thus, within the scope of the present invention, pulses, pulse trains, pulse interleaving, and pulse interleaving codes may be interchanged with bursts, burst trains, burst interleaving, and burst interleaving codes.

Figure 11:
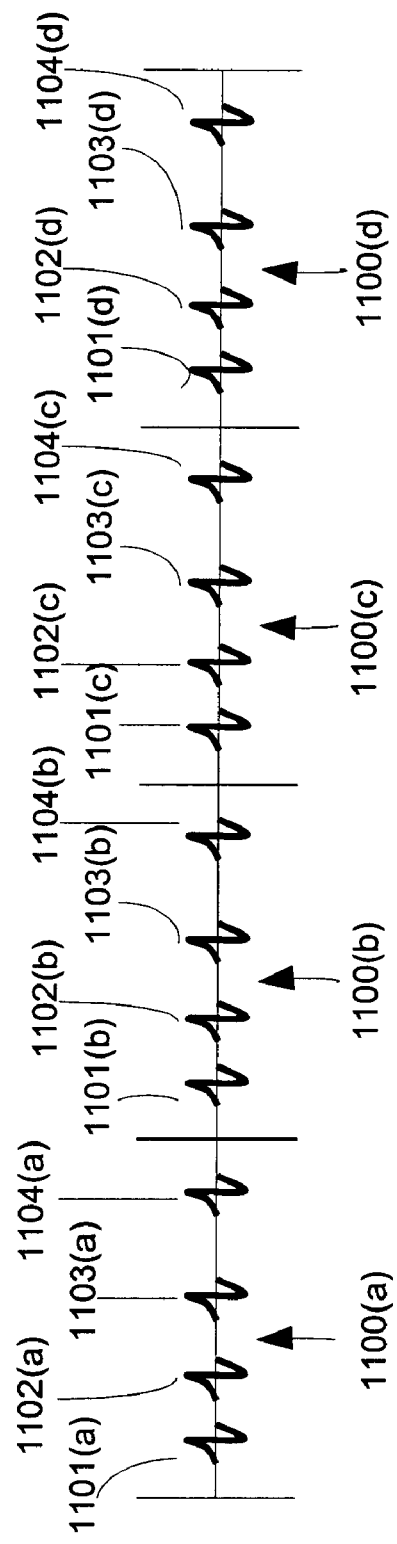
FIG. 11 illustrates a pulse train comprising time spaced signals.

FIG. 11 shows exemplary pulse trains 1100(a)–(d) each containing four pulses, 1101(a)–1104(a), 1101(b)–1104(b), 1101(c)–1104(c), and 1101(d)–1104(d), respectively. Conventionally, pulses 1101(a)–1104(a) in pulse train 1100(a) are received and integrated to produce a first data bit of the intelligence signal. Next, pulses 1101(b)–1104(b) of pulse train 1100(b) are received and integrated to produce a second data bit of the intelligence signal, and so on, such that pulses are received and integrated to produce data bits in a serial manner.

As discussed previously, various types of signals may interfere with the reception of time spaced impulse radio signals such as pulses or bursts. Periodic interference, in particular, may impact groups of pulses within a pulse train, while leaving others unaffected. For example, the signal reception of an impulse radio receiver operating within close proximity of an airport may be affected by a Doppler radar signal each time the radar beam sweeps across the receiver. Depending on the strength, frequency, and duration of the periodic interference, a significant number of pulses can be affected and, as a consequence, an integration ramp may be distorted enough to cause a data error. For example, if pulses 1101(b), 1102(b), and 1103(b) in FIG. 11 are interfered with by periodic interference, detection of the second data bit may be adversely affected.

According to the present invention, pulses required to detect a given data bit are distributed among multiple pulse trains and are interleaved with pulses required to detect other data bits such that multiple data bits are produced in a parallel manner. In this way, multiple integration ramps are built in parallel and interleaved pulses are contributed, or routed, to them based on the pulse interleaving order. By interleaving pulses, the present invention distributes adverse effects resulting from periodic interference to multiple integration ramps (and thus multiple data bits) such that the adverse effects of the periodic interference can be better absorbed by an impulse radio system. As a result of pulse interleaving, in the above example, the three pulses interfered with by periodic interference might be contributed to as many as three different integration ramps thereby reducing the likelihood of occurrence of a data error.

Under the present invention, the overall impact of periodic interference decreases as the distance in time between pulses contributing to a given integration ramp increases. Thus, the opportunity to reduce the impact of periodic interference using pulse interleaving increases as the number of integration ramps that generate corresponding intermediate signals in parallel increases. The number of integration ramps that a given impulse radio system may employ in a given environment and for a given application depends on the extent to which data latency inherent to producing data bits in parallel can be tolerated. Furthermore, in examples described below, consecutive pulse trains contribute pulses to the same integration ramp. However, the present invention does not require consecutive pulse trains to contribute pulses to a given integration ramp because the impact of periodic interference decreases as the separation between pulse trains contributing pulses to an integration ramp increases.

In the embodiments of the invention described below, two basic approaches are employed. In one approach, hereinafter called uncoded pulse interleaving, pulses are contributed to intermediate signals in accordance with a predefined pulse interleaving order. Under another approach, hereinafter called coded pulse interleaving, pulses are contributed to intermediate signals in accordance with code elements of a pulse interleaving code that specifies the interleaving order. Thus, the primary difference between the uncoded and coded approaches lies in the way in which the pulses are contributed to the intermediate signals, with the order of contribution being predefined in the uncoded approach, and in the coded approach, being defined by elements of a code. Pulse interleaving order can be fixed throughout the communication of an intelligent signal between a receiver and a transmitter. Alternatively, a variable pulse interleaving order can be used, where the order is varied from one communication period to another. Under all pulse interleaving approaches, i.e., coded, uncoded, fixed or variable, a selected pulse interleaving order must be known to both the transmitter and receiver.

Uncoded Pulse Interleaving

In one exemplary embodiment of the invention, the pulses from a sequence of N pulse trains having N pulses each are sequentially contributed to a sequence of N integration ramps that represent a sequence of N data bits of an intelligence signal. Referring again to FIG. 11, for example, each of four pulses 1101(a)–1104(a) comprising a pulse train 1100(a) are contributed to four different intermediate signals, which are produced by the ramps 1-4, in sequential order. Each of four pulse trains 1100(a)–1100(d), which each contain four pulses 1101(a)–1101(d), 1102(a)–1102(d), 1103(a)–1103(d), 1104(a)–1104(d), contribute pulses sequentially to each of the four ramps 1–4. Thus, as shown in Table 1 below, pulses 1101(a)–1101(d) are contributed to the intermediate signal produced by ramp 1, which represents data bit 1, pulses 1102(a)–11102(d) are contributed to the intermediate signal produced by ramp 2, which represents data bit 2, pulses 1103(a)–1103(d) are contributed to the intermediate signal produced by ramp 3, which represents data bit 3, and pulses 1104(a)–1104(d) are contributed to the intermediate signal produced by ramp 4, which represents data bit 4. Thus, the uncoded approach can apply a sequential pulse contribution order to the intermediate signals. Accordingly, when the pulse trains 1100(a)–1100(d) are received, pulses 1101–1104(a)–(d) are sequentially routed or otherwise contributed to four integration ramps that represent four sequential data bits of the intelligence signal.

Alternatively, the sequential order can be specified in reverse to that described above. That is, pulses 1104(a)–11104(d) can be contributed to the intermediate signal produced by ramp 1, pulses 1103(a)–1103(d) can be contributed to the intermediate signal produced by ramp 2, and so on. The pulse interleaving order can also be specified as a pseudorandom order, alternating order, round robin order, or some designed order. Because periodic interference inherently occurrences at a constant rate, or frequency, a pseudorandom pulse interleaving order can be particularly advantageous since varying the distance in time between pulses contributing to a given integration ramp decreases the likelihood that multiple occurrences of a periodically interfering signal will affect a given integration ramp.

TABLE 1

Sequential Pulse Interleaving and Bit Ordering

| Pulses 1101(a), 1101(b), 1101(c), 1101(d) | → | Ramp 1 | → | Data Bit 1 |
|---|---|---|---|---|
| Pulses 1102(a), 1102(b), 1102(c), 1102(d) | → | Ramp 2 | → | Data Bit 2 |
| Pulses 1103(a), 1103(b), 1103(c), 1103(d) | → | Ramp 3 | → | Data Bit 3 |
| Pulses 1104(a), 1104(b), 1104(c), 1104(d) | → | Ramp 4 | → | Data Bit 4 |

Coded Pulse Interleaving

Figure 12:
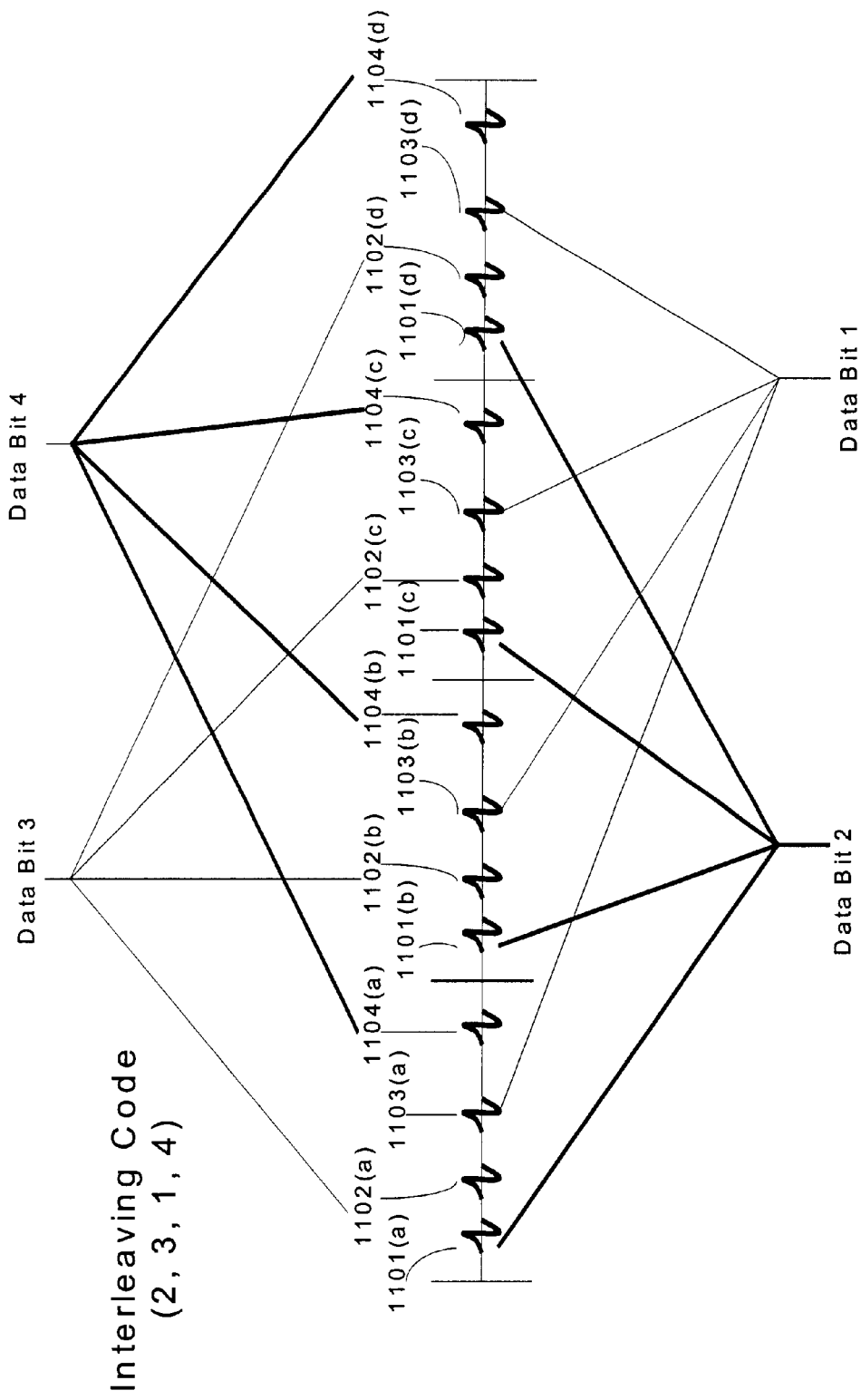
FIG. 12 illustrates contribution of pulses to different data bits.

In a further embodiment, N code elements of a pulse interleaving code specify how the pulses in each pulse train are routed or otherwise contributed to a sequence of N integration ramps that produce intermediate signals representing a sequence of N data bits of an intelligence signal. An impulse radio transmitter, such as the one described in connection with FIG. 9, uses the pulse interleaving code when generating the pulses that represent the intelligence signal. An impulse radio receiver, such as the one described in connection with FIG. 8, is given a priori knowledge of the pulse interleaving code used by the impulse transmitter for recovering the intelligence signal. The impulse radio receiver uses the pulse interleaving code to coherently detect and integrate the received pulses. In accordance with the present invention, the impulse receiver recovers the data bits conveyed by the intelligence signal. As shown in FIG. 12, for example, a pulse interleaving code (2, 3, 1, 4) might specify the mapping of the pulses 1101(*a*)–1101(*d*), 1102(*a*)–1102(*d*), 1103(*a*)–1103(*d*), 1104(*a*)–1104(*d*) in four pulse trains 1100(*a*)–1100(*d*) to four integration ramps that produce the intermediate signals. Based on the pulse interleaving code element 1, i.e., 2, pulses 1101(*a*)–1101(*d*) are routed or otherwise contributed to ramp 2, which produces an intermediate signal corresponding to data bit 2, pulses 1102(*a*)–1102(*d*) are routed or otherwise contributed to ramp 3, which produces an intermediate signal corresponding to data bit 3, pulses 1103(*a*)–1103(*d*) are routed or otherwise contributed to ramp 1, which produces an intermediate signal corresponding to data bit 1, and pulses 1104(*a*)–1104(*d*) are routed or otherwise contributed to ramp 4, which produces an intermediate signal corresponding to data bit 4, as shown in Table 2 below.

TABLE 2

Coded Pulse Interleaving and Sequential Bit Ordering

| Pulses 1101(a), 1101(b), 1101(c), 1101(d) | → | Ramp 2 | → | Data Bit 2 |
|---|---|---|---|---|
| Pulses 1102(a), 1102(b), 1102(c), 1102(d) | → | Ramp 3 | → | Data Bit 3 |
| Pulses 1103(a), 1103(b), 1103(c), 1103(d) | → | Ramp 1 | → | Data Bit 1 |
| Pulses 1104(a), 1104(b), 1104(c), 1104(d) | → | Ramp 4 | → | Data Bit 4 |

Although in previously described embodiments each pulse train contributes one pulse to each integration ramp, an interleaving code may specify that a pulse train contribute multiple pulses to the same ramp. Furthermore, an interleaving code may specify that a pulse train not contribute a pulse to a particular ramp. For example, a sixteen-element pulse interleaving code having elements (2, 1, 4, 1, 3, 2, 4, 3, 2, 1, 4, 1, 4, 3, 2, 3) could be applied to four pulse trains having four pulses each. Under this arrangement the second pulse and fourth pulse of the first pulse train and the second pulse and fourth pulse of the third pulse train would be contributed to ramp 1, the first pulse of the first pulse train, the second pulse of the second pulse train, the first pulse of the third pulse train, and the third pulse of the fourth pulse train would be contributed to ramp 2, and so on. It should also be noted that the same mapping would apply had the same sixteen element pulse interleaving code been used to map a pulse train having sixteen pulses to four integration ramps.

As was the case with the previous example, the present invention does not require that the number of code elements of a pulse interleaving code have a one-to-one correspondence with the number of ramps. Generally, the number of code elements of a pulse interleaving code, the number of pulses in each pulse trains, the number of integration ramps, and the integration length for each ramp could differ. For example, a pulse interleaving code that has four elements (1, 2, 2, 1) could be used to specify the routing of pulses from a train of sixteen pulses to two integration ramps having eight integration steps each. In this case, the sixteen pulses would be grouped into four groups of four pulses where the first and the fourth pulse of each group would be contributed to ramp 1 and the second and third pulse of each group would be contributed to ramp 2. Thus, for the sixteen pulses, the first, fourth, fifth, eighth, ninth, twelve, thirteen, and sixteenth pulse would be contributed to the first ramp and the second, third, sixth, seventh, tenth, eleventh, fourteen, and fifteenth pulses would be contributed to the second ramp. Someone of ordinary skill in the art would appreciate that various combinations of pulse interleaving code length, pulse train length, number of ramps, and integration steps per ramp, may be used in connection with the present invention.

Bit Ordering Codes

In the previously described embodiments of the present invention, the intermediate signals are ordered to have a one-to-one correspondence with the recovered bits. In other words, the integration ramp order is the same as the bit order. According to another embodiment of the present invention, an intelligence signal can be produced according to a bit ordering code, which is used by both the transmitter and the receiver independent from the pulse interleaving code. In one arrangement, code elements of the bit ordering code specify the order of the data bits where the code element position represents the ramp number, i.e., the intermediate signal, and the code element value represents the bit number. For example, a bit ordering code of (4, 2, 1, 3) has a first element 4, a second element 2, a third element 1, and a fourth element 3. As such, the first element (i.e., 4) specifies the the intermediate signal of ramp 1 corresponds to data bit 4 of the intelligence signal, the second element (i.e., 2) specifies that the intermediate signal of ramp 2 corresponds to data bit 2, the third element (i.e., 1) specifies that the intermediate signal of ramp 3 corresponds to data bit 1, and the fourth element (3) specifies that the intermediate signal of ramp 4 corresponds to data bit 3. Accordingly, if the intermediate signals of the four integration ramps correspond to four data bits 1 0 1 0, respectively, the bit ordering code (4, 2, 1, 3) would represent an intelligence signal of 1 0 0 1. Alternatively, a bit ordering code may be applied where the code element position represents the bit number and the code element value represents the ramp number. With this arrangement, the same bit ordering code of (4, 2, 1, 3) specifies that ramp 4 provides bit 1, ramp 2 provides bit 2, ramp 1 provides bit 3, and ramp 3 provides bit 4, In a further embodiment, a bit ordering code specifies how data bits are applied to multiple intelligence signals. For example, a bit ordering code of (1 2 2 1) might be used to specify that data bits 1 and 4 be applied to a first intelligence signal and that bits 2 and 3 be applied to a second intelligence signal. In another embodiment the bit ordering code specifies the intelligence signal to which each bit is applied and the order. For example, the code (3, 1, 2, 4) might specify that bit 2 and bit 1 be applied to a first intelligence signal and bits 3 and 4 be applied to a second intelligence signal, where odd integers designate the first intelligence signal, even integers designate the second intelligence signal, and the bits are applied to a given intelligence signal in ascending order.

As stated above, pulse interleaving order and bit order can be employed independent from each other. As such, a pulse interleaving code may be used with or without a bit ordering code. Also, a bit ordering code can be used with or without a pulse interleaving code. Additionally, a pulse interleaving order can be structured differently from a bit order, for example a sequential pulse interleaving order combined with a pseudorandom bit order, or vice versa. If desired, the pulse interleaving order and bit order may be structured similarly.

Multiple Pulse Interleaving Codes and Bit Ordering Codes

More than one interleaving code can be used to specify the contribution order of pulses to the intermediate signals (or groups of intermediate signals). For example, a first pulse interleaving code could be used to build N ramps, and then a second pulse interleaving code could be used to build M ramps, a third pulse interleaving code could be used to build L ramps, and so on. The number of ramps produced using each pulse interleaving code could be determined by another code, e.g., (N, M, L, K), which may be repeated. Similarly, more than one bit ordering code can be used. For example, a first bit ordering code could be used for N ramps, and then a second bit ordering code could be used for M ramps, a third bit ordering code could be used for L ramps, and so on, where the number of ramps applied using each bit ordering code could be determined by another repeating code, e.g., (N, M, L, K).

Shift Codes

The contribution of the time spaced signals to the intermediate signals, as specified by a pulse interleaving code, may be modified relative to another code. In one embodiment, a shift code, which is designed relative to a pulse interleaving code, is used to change the contribution order specified by the pulse interleaving code. Under this arrangement, code elements of the shift code increment or decrement a pulse interleaving code some number of times using modulo math to produce shifted versions of the original pulse interleaving code. In other words, pulse interleaving code elements having possible values ranging from 1 to N are incremented or decremented using modulo N math. An exemplary shift code (+1, −1, +2, 0) has four code elements. The first element (+1) specifies shifting the code element values of a pulse interleaving code forward by one, the second element (−1) specifies shifting the code element values of a pulse interleaving code backward by one, the third element (+2) specifies shifting the code element values of a pulse interleaving code forward by two, and the fourth element (0) specifies no shift in the code element values of a pulse interleaving code. This shift code could be applied to the same pulse interleaving code or to the pulse interleaving code resulting from each shift. For example, by applying the shift code (+1, −1, 2, 0) to the pulse interleaving code (2, 3, 1, 4) shown in Table 2, four pulse interleaving codes are produced (3, 4, 2, 1), (1, 2, 4, 3), (4, 1, 3, 2), and (2, 3, 1, 4). The first code is produced by applying the first element of the shift code (+1) to all four elements (2, 3, 1, 4) of the pulse interleaving code, thereby producing a code having elements (i.e., 2+1=3, 3+1=4, 1+1=2, 4+1 modulo 4=1). Similarly, three other codes (1, 2, 4, 3), (4, 1, 3, 2), and (2, 3, 1, 4) are produced by applying the remaining elements of the shift code (i.e., −1, 2, and 0) to the pulse interleaving code. Shift code elements can be applied after some predetermined number of pulse train occurrences. For example, a shift code could be applied to the pulse interleaving code after a predetermined number of pulse train cycles, N, where each shift code element is preferably applied to N occurrences of a pulse train, and N is the number of code elements in the shift code. Various approaches can be used to specify how long a pulse interleaving code is used before a shift code element is applied.

Individual Pulse Quality Assessment

The present invention can be used to effectively isolate and then assess the reception quality of individual pulses. Specifically, as previously described, pulses may be sequentially contributed to a sequence of ramps such that each ramp is comprised of like pulses. In such a case, ramp 1 may be comprised of only the first pulses of successive pulse trains, ramp 2 may be comprised of only the second pulses of successive pulse trains, and so on. Accordingly, received signal quality measures for each ramp may be compared to evaluate the reception of specific pulses in the pulse trains. The reception evaluation includes determining a signal quality measure, for example, some combination of signal-to-noise ratio (SNR), bit error ratio (BER), signal strength, etc. In this manner, the present invention can determine which pulses are being interfered with by an interfering signal such as a periodic interference signal or a signal produced by another impulse radio system operating in close proximity.

Dynamic Pulse Interleaving

Under one embodiment of the present invention, the contribution of the integrated detected signals to the intermediate signals is changed to improve received signal quality. Based on the signal quality measures, the present invention may dynamically modify a pulse interleaving code such that the effects of interference to specific pulses is more evenly distributed among integration ramps. Specifically, when the signal quality value of one or more of the ramps is determined to be lower than a specified threshold that include, for example, the signal quality value of another ramp, the present invention can dynamically alter the pulse interleaving code to optimally redistribute the contribution of pulses to the ramps to satisfy one or more signal quality criteria. For example, referring to FIG. 12, signal quality measures for the four integration ramps may provide an indication of the average reception of the four pulses in the pulse train. By redistributing pulse contributions, the expected signal quality measures for the four integration ramps could be set to meet a specified threshold.

Signal quality measures for ramps made up of intermediate signals from different pulses can also be used to determine a more optimal distribution of intermediate signals. For example, a pulse interleaving code could route the pulses of four pulse trains having four pulses each such that ramp 1 is comprised of intermediate signals from the third pulses of three pulse trains and the second pulse of a fourth pulse train, ramp 2 is comprised of intermediate signals from three second pulses and one third pulse, and ramp 3 and 4 are comprised of intermediate signals from four first pulses and four fourth pulses, respectively. According to the present invention, signal quality measures for the four ramps could be used to modify the pulse interleaving code such that the first and second ramps would each be comprised of the intermediate signals from two second pulses and two third pulses. Generally, signal quality measures for ramps comprised of any distribution of intermediate signals can be used to determine a more optimal intermediate signal distribution According to one feature of the present invention, different contribution patterns are examined to determine those that result in improved signal quality. There are many strategies that can be used to modify a pulse interleaving code to achieve improved signal quality. In one embodiment, integrated detected signals are randomly redistributed among intermediate signals in a trial-and-error manner to determine an optimal pulse interleaving order. In an alternative embodiment, an optimal order search algorithm is used to find an optimal contribution order. An optimal search algorithm may be based on a well-known search method including, for example, a Newton-Raphson method, steepest descent method, secant method, conjugate gradients method, first derivative test method, second derivative test method, or other such method. In another embodiment, statistical redistribution is used to modify the pulse interleaving code such as was described in the first dynamic pulse interleaving example above.

Dynamic changes to a pulse interleaving code require coordination between a transmitter and a receiver, or between transceivers. Typically, one transceiver would communicate desired pulse interleaving code changes to another transceiver, as well as the timing when the changes are to take effect, and, after appropriate acknowledgements, the desired changes would be implemented by both transceivers. Such coordination between transceivers is well understood by those skilled in the art of communications.

Modifying Time-Hopping Codes or Delaying Pulse Trains

The ability of the present invention to effectively isolate and evaluate the reception of individual pulses is particularly advantageous in relation to coexisting impulse radio systems. Impulse radio systems designed to operate in close proximity typically use time-hopping codes of the same code family that are designed to limit the number of coincidences between any two impulse radio signals. Such systems usually operate asynchronously to each other and, as a consequence, the specific pulses of two impulse radio signals that do coincide at a given receiver, if any, depends to a large extent on the offset in time between the two signals arriving at the receiver. In other words, the number of pulse coincidences typically varies with the time offset between the two signals arriving at a given receiver. Furthermore, the pulses that coincide between two asynchronous pulse train signals arriving at a receiver are typically unknown until the time offset between the two signals has been established.

The present invention can provide indications of pulse collisions between coexisting impulse radio signals arriving at a receiver that can be used to modify the time hopping code used by one of the signals so that pulse collisions are avoided. Referring to FIG. 12, for example, if the intermediate signal corresponding to data bit 3 repeatedly has a signal quality measure below the other intermediate signals, it is likely that the second pulse of each pulse train is being interfered with by a pulse from another impulse radio signal. In one embodiment of the present invention, a transceiver modifies the time hopping code being used by the transceiver with which it is communicating by changing code elements corresponding to pulse positions for which there is an indication of a pulse coincidence such that pulses are moved to another position. In the example above, the code element specifying the second pulse of each pulse train, which corresponds to data bit 3, would be changed to a different value. If necessary, the transceiver may continue to change the code element that specifies the second pulse of the pulse train until the signal quality measure for the second integration ramp meets a quality criterion.

Instead of modifying the time hopping code, a transceiver may collaborate with the transceiver with which it is communicating to delay transmission of its pulse train signal as described in a co-pending application entitled "SYSTEM AND METHOD FOR APPLYING DELAY CODES TO CODED DATA SIGNALS," which is hereby incorporated by reference. According to this embodiment of the present invention, a transceiver requests that its partner transceiver delay the transmission of its pulse train for some amount of time. Afterwards, signal quality measures can be evaluated to determine if pulse coincidences remain. If necessary, this process can continue until a signal quality criterion is met.

When coordinating the modification of a time hopping code or the delay of a pulse train, the present invention may maintain correlation or spectral requirements based on a relationship between a plurality of codes in a code family. Specifically, if signal quality measures indicate pulse coincidences of two or more pulses, it is possible to discern the time hopping code used by the interfering impulse radio signal based on inter-pulse spacing of the pulses being interfered. Generally, for a given code family, only a subset of the codes specify pulse positions having the inter-pulse spacing indicated by the signal quality measures. Based on a priori knowledge of this subset of codes, the present invention can determine an appropriate change to a time hopping code or a delay of a pulse train. Furthermore, changes to a time hopping code may be governed by spectral properties. Specifically, only certain changes to a time hopping code may be allowed such that spectral properties are maintained. For example, the present invention may only change a given code element to one of a limited number of values previously determined to maintain spectral properties.

Amplitude Modulation

The ability of the present invention to evaluate the reception of individual pulses can be used to support amplitude modulation. In a further embodiment of the present invention, an intermediate signal is used as a reference that is compared to other intermediate signals in order to demodulate received amplitude-modulated signals. The level of the reference intermediate signal can then be compared to the level of other intermediate signals produced by pulses having like amplitudes that may or may not be the same as the reference pulses. More specifically, the dynamic range of the reference intermediate signal can me divided into N levels to represent an M bit sequence such that N=2M. In this way, for example, two levels can represent 1 bit, four levels can represent 2 bits, eight levels can represent 3 bits, and so on.

In order to support amplitude modulation, one exemplary embodiment of the invention normalizes intermediate signals relative to the reference signal to determine its level in terms of unity and fractions thereof. For example, for representing two bits of information, an intermediate signal normalized relative to the reference intermediate signal can have 4 normalized levels comprising ¼, ½, ¾ and 1. These formalized levels, ¼, ½, ¾, and 1, can be used to represent the four combinations of two bits 00, 01, 10, and 11, respectively.

A reference intermediate signal can be produced in a variety of ways. In one embodiment, pulses with the same amplitude are routed to a single integration ramp and the level of the intermediate signal of that particular ramp is used as a reference. An integration ramp can be dedicated to being a reference ramp. For example, every Kth integration ramp might be used as a reference. In one embodiment, a reference pattern is used. Under this arrangement, a transmitter transmits a known bit sequence to one or more ramps during a "calibration" process that sets the reference. This calibration process may occur at start up and periodically afterwards. Alternatively, a system may automatically recalibrate each time a predetermined reference pattern is received as part of regular data reception. For example, each time the bit pattern 1 0 0 1 1 0 0 1 is received, a ramp corresponding to one of the bits could automatically provide the reference signal level.

As is well known, the amplitude of impulse radio signals at a receiver decreases as the distance from a transmitter increases, and vice versa. Thus, under mobile communication applications, when a variable distance exists between a transmitter and receiver, the reference signal may be updated more frequently than under fixed communication applications, when the distance between the receiver and transmitter is constant.

Signal Acquisition

The ability of the present invention to evaluate the reception of individual pulses can also be used to support signal acquisition. In a further embodiment of the present invention, an intermediate signal is used as a time reference that is compared to other intermediate signals in order to determine time positioning of the pulse in a received pulse train signal. Specifically, intermediate signals indicating coherent detection of individual pulses of the pulse train are identified based on a measured level that exceeds a defined threshold. Then, the time spacing between the identified pulses is determined. Based on the time spacing of the identified pulses and the spacing between the pulses, as defined by the known time hopping code, an appropriate time offset is determined to coherently detect the received pulse train signal. For example, sixteen pulse trains having sixteen pulses each produce sixteen intermediate signals in accordance with the sequential pulse-interleaving embodiment of the invention. The sixteen intermediate signals are compared to a bit detection threshold. Based on the bit detection threshold, the third, eighth, and tenth intermediate signals indicate that a pulse within the pulse train was coherently detected. Based on the time hopping code used to determine the timing of the coherent detection of the pulses, the spacing in time between the third and eighth, eighth and tenth, and tenth and third pulses, is calculated. By comparing the calculated time spacing to known time spacing of the pulses within the pulse train, the three pulses are identified as actually being the fifth, tenth, and twelfth pulses of the received pulse train. Accordingly, the time reference used by the receiver is changed by an amount equal to the time spacing between the time positions specified by the third and fifth code elements of the time hopping code being used, thereby synchronizing the receiver with the received pulse train signal for the purpose of signal acquisition.

In a further embodiment of the present invention, an intermediate signal is used as an amplitude reference that is compared to other intermediate signals in order to determine time positioning of the receiving signal. Specifically, pulses are amplitude modulated in accordance with a predetermined acquisition pattern. Intermediate signals indicating coherent detection of individual pulses of the received pulse train signal are identified. The difference in signal level of the intermediate signals indicating coherently detected pulses is compared to the predetermined acquisition pattern to identify the positioning of pulses within the received pulse train signal. The appropriate time offset required to coherently detect the received pulse train signal is then determined based on the identities of the pulses within the received pulse train signal that have been acquired. For example, the sixteen pulses in each of the sixteen pulse trains in the previous example are amplitude modulated such that they have an acquisition pattern of 1, ½, ¾, 1¼, 1½, 1¾, 2½, 2¼, 2½, 2¼, 2, 1¾, 1½, 1¼, ¾, ½ normalized amplitudes and are interleaved in accordance with the sequential pulse-interleaving embodiment of the invention. The receiver produces sixteen intermediate signals and a bit-detection threshold indicates that pulses have been coherently detected by the second and eighth integration ramps. A comparison of the intermediate signal levels shows that the second intermediate signal is approximately twice that of the eighth intermediate signal. Based on the comparison of the two intermediate signal levels and a priori knowledge of the acquisition pattern, it is determined that the second and eighth intermediate signals correspond to the thirteenth and third pulses of the pulse train, respectively. Accordingly, the time reference used by the receiver is changed by an amount equal to the time spacing between the time positions specified by the second and thirteenth code elements of the time hopping code being used thereby synchronizing the receiver with the received pulse train signal. It should be noted that this embodiment could also be used to support acquisition of uniformly spaced (i.e., uncoded), amplitude modulated pulse trains.

In another embodiment of the present invention, an intermediate signal is used as an amplitude reference and a time reference that are compared to amplitudes and times of other intermediate signals in order to determine time positioning of the receiving signal. Specifically, pulses are amplitude modulated in accordance with a predetermined acquisition pattern. Intermediate signals indicating coherently detected pulses of the received pulse train signal are identified. The difference in signal level of the intermediate signals indicating coherently detected pulses and the spacing in time between the coherently detected pulses are compared to the predetermined acquisition pattern and to known time spacing between pulses of the pulse train to identify the positioning of pulses within the received pulse train signal. The appropriate time offset required to coherently detect the received pulse train signal is then determined based on the identities of the pulses within the received pulse train signal. For example, the sixteen pulses in each of the sixteen pulse trains in the previous example are amplitude modulated such that they have an acquisition pattern of 1, ½, ¾, 1¼, 1½, 1¾, 2½, 2¼, 2½, 2¼, 2, 1¾, 1½, 1¼, ¾, ½ normalized amplitudes and are interleaved in accordance with the sequential pulse-interleaving embodiment of the invention. The receiver produces sixteen intermediate signals and a bit-detection threshold indicates that pulses have been coherently detected by the second and eighth integration ramps. A comparison of the intermediate signal levels shows that the second intermediate signal is approximately twice that of the eighth intermediate signal. Based on the comparison of the two intermediate signal levels and a priori knowledge of the acquisition pattern and a priori knowledge of inter-pulse time spacing of the pulse train as specified by the time hopping code, a determination is made that the second and eighth intermediate signals correspond to the thirteenth and third pulses of the pulse train, respectively. The time reference used by the receiver is changed by an amount equal to the time spacing between the time positions specified by the second and thirteenth code elements of the time hopping code being used to synchronize the receiver with the received pulse train signal.

Exemplary Embodiment

Figure 13:
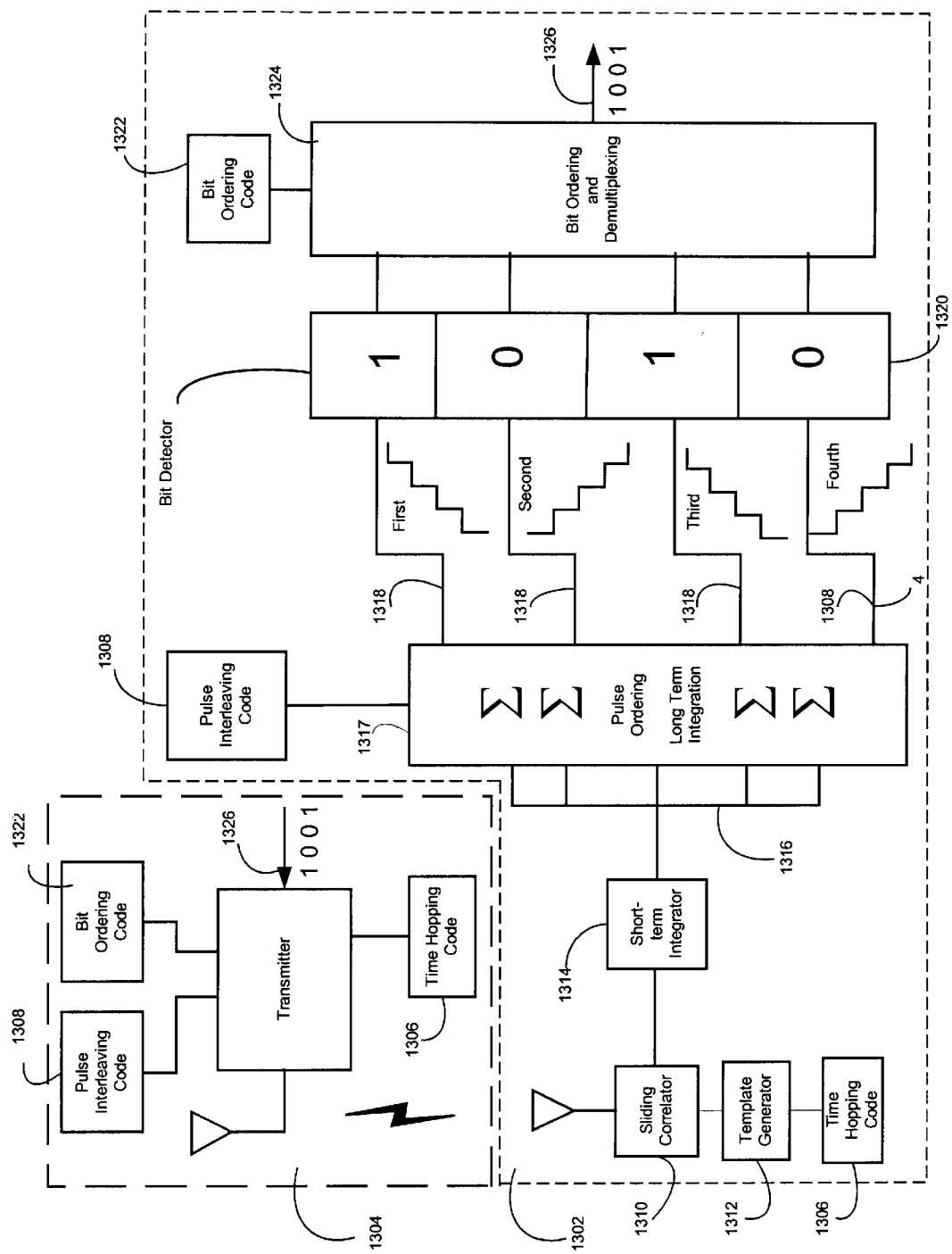
FIG. 13 illustrates a transmitter and a receiver according to a preferred embodiment of the invention.

FIG. 13 depicts a receiver 1302 and a transmitter 1304 communicating time spaced signals in accordance with the present invention. To convey at least one intelligence signal 1326, the transmitter 1304 generates time spaced signals comprising pulse trains, such as pulse trains 1100(a)–1100(d), that include pulses positioned in time in accordance with a time hopping code 1306. Moreover, the pulses are transmitted based on a pulse interleaving code 1308 and a bit ordering code 1322 in accordance with the present invention.

The time spaced signals are received at a receiver antenna. Based on a priori knowledge of the time hopping code 1306 used in the transmitter 1304, the sliding correlator 1310 of the receiver 1302 coherently detects the received signal by mixing a template signal provided by a template generator 1312 with the time spaced signals received by the antenna. As stated above, coherent detection normally includes performing a short-term integration of the pulses in the received signals. Using a short-term integrator 1314, the present invention separately integrates the pulses of the received signal to produce a plurality of integrated detected signals 1316.

A long-term integration block 1317 contributes each of the integrated detected signals 1316 to one of a plurality of intermediate signals 1318 in accordance with the pulse interleaving code 1308, which is used in the transmitter 1304 and is known to the receiver 1302. Intermediate signals 1318 are illustrated as up-ramps or down-ramps. As each integrated detected signal is being routed or otherwise contributed to its respective intermediate signal, it is summed with previously detected signals to build the up-ramps or down-ramps. When a ramp passes a selected threshold, a bit detector 1320 produces a corresponding "1" or "0" data bit. The data bits produced by the ramps are then ordered by bit ordering and demultiplexing block 1324 based on a bit ordering code 1322 used by the transmitter 1304 and known to the receiver 1302 to produce the at least one intelligence signal 1326.

The embodiments illustrated and discussed in this specification are intended only to teach the best mode to make and use the invention to those skilled in the art. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

Thus, the present invention provides a method and system for applying pulse interleaving codes to time spaced signals representing an intelligence signal. In one exemplary embodiment, the present invention may be used in an UWB communications system.

What is claimed:

1. A method of receiving a plurality of time spaced signals transmitted in accordance with a time layout, comprising:

recovering a receive signal comprising a plurality of time spaced signals that convey at least one intelligence signal, coherently detecting the receive signal, integrating, separately, a plurality of coherently detected signals to produce a plurality of integrated detected signals, contributing each integrated detected signal to one of a plurality of intermediate signals to which said each integrated detected signal can be contributed, integrating, separately, each of said plurality of intermediate signals, and producing the at least one intelligence signal based on the plurality of integrated intermediate signals.

2. The method of claim 1 wherein the intermediate signals are integrated relative to a repeating time layout.

3. The method of claim 1, wherein the intermediate signals are integrated independent of a repeating time layout.

4. The method of claim 1, wherein the time spaced signals are positioned in time in accordance with a time hopping code.

5. The method of claim 1, wherein the time spaced signals are uniformly positioned in time.

6. The method of claim 1, wherein the time spaced signals are modulated in accordance with a modulation technique.

7. The method of claim 6, wherein the modulation technique comprises at least one of:

time shift modulation, amplitude modulation, frequency modulation, and phase modulation.

8. The method of claim 1, wherein the time spaced signals comprise pulses.

9. The method of claim 1, wherein the time spaced signals comprise bursts.

10. The method of claim 1, wherein coherently detecting the receive signal comprises correlating the plurality of time spaced signals with a plurality of template signals at specified positions in time.

11. The method of claim 10, wherein at least one of said plurality of template signals comprises a pulse.

12. The method of claim 10, wherein at least one of said plurality of template signals comprises a burst.

13. The method of claim 1, wherein each integrated detected signal is contributed in accordance with a predefined pulse interleaving order.

14. The method of claim 13, wherein the predefined pulse interleaving order is at least one of:

a sequential order; and a pseudorandom order.

15. The method of claim 1, wherein each integrated detected signal is contributed in accordance with a code element of a pulse interleaving code.

16. The method of claim 15, wherein the pulse interleaving code is a pseudorandom code.

17. The method of claim 15, wherein the pulse interleaving code is modified after said at least one intelligence signal is produced.

18. The method of claim 17, wherein said pulse interleaving code is modified in accordance with a shift code.

19. The method of claim 1, wherein the at least one intelligence signal is produced by ordering the plurality of integrated intermediate signals in accordance with a predefined data bit order.

20. The method of claim 19, wherein the predefined data bit order is at least one of:

a sequential order; and a pseudorandom order.

21. The method of claim 1, wherein the at least one intelligence signal is produced by ordering the plurality of integrated intermediate signals in accordance with code elements of a bit ordering code.

22. The method of claim 21, wherein the bit ordering code is a pseudorandom code.

23. The method of claim 1, further comprising the steps of:

determining an intermediate signal quality measure;

modifying an integrated detected signal contribution to said-at-least one of said plurality of intermediate signals based on the intermediate signal quality measure.

24. The method of claim 23, wherein modifying the integrated detected signal contribution comprises:

modifying a pulse interleaving code and coordinating the modification of the pulse interleaving code between a transmitter and receiver.

25. The method of claim 23, wherein the integrated detected signal contribution is modified based on at least one of:

a statistical redistribution;

a random redistribution, and an optimal order search algorithm.

26. The method of claim 1 further comprising:

determining an intermediate signal quality measure;

modifying a time hopping code based on the intermediate signal quality measure; and coordinating the modification of the time hopping code between a transmitter and receiver.

27. The method of claim 26, wherein the time hopping code is modified based on a relationship between a plurality of codes in a code family.

28. The method of claim 1 further comprising:

determining an intermediate signal quality measure;

delaying a pulse train signal based on the intermediate signal quality measure; and coordinating the delay of the pulse train signal between a transmitter and receiver.

29. The method of claim 28, wherein the pulse train signal is delayed based on a relationship between a plurality of codes in a code family.

30. The method of claim 1, wherein an intermediate signal of said plurality of intermediate signals is compared to another intermediate signal of said plurality of intermediate signals.

31. The method of claim 30, wherein said an intermediate signal of said plurality of intermediate signals is used as a reference relative to said another intermediate signal of said plurality of intermediate signals.

32. The method of claim 31, wherein an intermediate signal of said plurality of intermediate signals is used as an amplitude reference relative to said another intermediate signal of said plurality of intermediate signals.

33. The method of claim 32, wherein the amplitude reference is used to demodulate at least one of said plurality of time spaced signals.

34. The method of claim 32, wherein the amplitude reference is used to synchronize in time a plurality of template signals with the plurality of received time spaced signals.

35. The method of claim 31, wherein said an intermediate signal of said plurality of intermediate signals is used as a time reference relative to said another intermediate signal of said plurality of intermediate signals.

36. The method of claim 35, wherein the time reference is used to synchronize in time a plurality of template signals with the plurality of received time spaced signals.

* * * * *